(12) United States Patent
Jones et al.

(10) Patent No.: US 8,715,503 B2
(45) Date of Patent: May 6, 2014

(54) METHOD FOR THE REMEDIATION OF SALT-CONTAINING WASTEWATER STREAMS

(71) Applicants: R. Gavin Jones, Huntsville, TX (US); Kenneth Wilson, Tyler, TX (US); Sabin Holland, The Woodlands, TX (US); Michael D. Rainone, Palestine, TX (US)

(72) Inventors: R. Gavin Jones, Huntsville, TX (US); Kenneth Wilson, Tyler, TX (US); Sabin Holland, The Woodlands, TX (US); Michael D. Rainone, Palestine, TX (US)

(73) Assignee: Sam Houston State University, Huntsville, TX (US)

( * ) Notice: Subject to any disclaimer, the term of this patent is extended or adjusted under 35 U.S.C. 154(b) by 0 days.

(21) Appl. No.: 13/671,884

(22) Filed: Nov. 8, 2012

(65) Prior Publication Data

US 2013/0126427 A1  May 23, 2013

Related U.S. Application Data

(63) Continuation of application No. 13/479,993, filed on May 24, 2012, now abandoned.

(60) Provisional application No. 61/489,932, filed on May 25, 2011.

(51) Int. Cl.
*C02F 3/00* (2006.01)

(52) U.S. Cl.
USPC ........... 210/615; 210/616; 210/617; 210/620; 210/241; 210/173

(58) Field of Classification Search
USPC ............. 210/615–618, 748.01, 173, 241, 620
See application file for complete search history.

(56) References Cited

U.S. PATENT DOCUMENTS

| | | |
|---|---|---|
| 4,009,098 A | 2/1977 | Jeris |
| 4,085,041 A | 4/1978 | Fullerton et al. |
| 4,696,901 A | 9/1987 | Robertson et al. |
| 4,994,391 A | 2/1991 | Hoffmann |

(Continued)

FOREIGN PATENT DOCUMENTS

| | | |
|---|---|---|
| EP | 0745562 | 12/1996 |
| JP | 05-192677 | 8/1993 |

(Continued)

OTHER PUBLICATIONS

"Aeration of Animal Wastes Newman Environmental Solutions, Inc. (NESi) Greenville, N.C.," available on the Advanced Aeration, Inc. website at http://www.advancedaeration.com. Published 1998.

(Continued)

*Primary Examiner* — Chester Barry
(74) *Attorney, Agent, or Firm* — Meyertons, Hood, Kivlin, Kowert & Goetzel, P.C.; Eric B. Meyertons

(57) ABSTRACT

In some embodiments, a wastewater treatment system may reduce contaminants in water. A system may include one or more bioreactors which include a substrate that supports a biofilm. The bacteria used to form the biofilm may be selected to maximize the reduction of contaminants in water. Various components of the wastewater treatment system may be optimized to improve the efficiency and energy consumption of the wastewater system.

30 Claims, 21 Drawing Sheets

(56) References Cited

U.S. PATENT DOCUMENTS

| | | |
|---|---|---|
| 5,217,616 A | 6/1993 | Sanyal et al. |
| 5,388,316 A | 2/1995 | Maclaren |
| 5,599,451 A | 2/1997 | Guiot |
| 5,744,337 A | 4/1998 | Price et al. |
| 5,756,304 A | 5/1998 | Jovanovich |
| 5,912,398 A | 6/1999 | Goldstein et al. |
| 5,928,514 A | 7/1999 | Gothreaux |
| 5,976,377 A | 11/1999 | Hyfantis, Jr. et al. |
| 6,013,511 A | 1/2000 | Diels et al. |
| 6,039,875 A | 3/2000 | Christiansen et al. |
| 6,245,237 B1 | 6/2001 | Blough et al. |
| 6,335,191 B1 | 1/2002 | Kiplinger et al. |
| 6,342,159 B1 | 1/2002 | Caplan et al. |
| 6,461,500 B1 | 10/2002 | Hoage et al. |
| 6,719,902 B1 | 4/2004 | Alvarez et al. |
| 6,758,633 B2 | 7/2004 | Yen |
| 6,790,355 B2 | 9/2004 | Shaffer et al. |
| 6,790,365 B2 | 9/2004 | Hirai |
| 6,841,515 B2 | 1/2005 | Burnham |
| 6,849,445 B2 | 2/2005 | Fayolle et al. |
| 6,861,245 B1 | 3/2005 | Smit |
| 6,921,477 B2 | 7/2005 | Wilhelm |
| 6,989,102 B1 | 1/2006 | Park et al. |
| 7,022,234 B2 | 4/2006 | Shaffer et al. |
| 7,175,766 B2 | 2/2007 | Kim et al. |
| 7,189,281 B2 | 3/2007 | Kim |
| 7,326,344 B2 | 2/2008 | Cotoras Tadic et al. |
| 8,425,775 B2 * | 4/2013 | Post et al. ............. 210/610 |
| 2001/0011643 A1 | 8/2001 | Newton et al. |
| 2004/0175407 A1 | 9/2004 | McDaniel |
| 2005/0150829 A1 | 7/2005 | Chen |
| 2006/0163154 A1 | 7/2006 | Tay et al. |
| 2007/0205148 A1 | 9/2007 | Jones et al. |
| 2007/0205149 A1 | 9/2007 | Jones et al. |
| 2007/0205150 A1 | 9/2007 | Jones et al. |
| 2007/0205151 A1 | 9/2007 | Plishker et al. |
| 2007/0205157 A1 | 9/2007 | Jones et al. |
| 2007/0207534 A1 | 9/2007 | Jones et al. |
| 2010/0307753 A1 * | 12/2010 | Rey et al. ............. 166/305.1 |
| 2011/0233125 A1 | 9/2011 | Jones et al. |
| 2012/0037568 A1 * | 2/2012 | Karrs et al. ............. 210/709 |

FOREIGN PATENT DOCUMENTS

| | | |
|---|---|---|
| JP | 07-251191 | 10/1995 |
| RU | 2407786 C1 * | 12/2010 |
| WO | 9218609 | 10/1992 |
| WO | 2004052795 | 6/2004 |
| WO | WO 2010076794 A1 * | 7/2010 |

OTHER PUBLICATIONS

"Apex Innovation Test Development of Vacuum Bubble® Aerator for Remediation of Petroleum Contaminated Sites," available on the Advanced Aeration, Inc. website at http://www.advancedaeration.com. Published 2004.

"Bioremediation of Contaminated Soil, Groundwater, and Wastewater" from the Environmental Biotechnology Laboratory website at http://www.nies.go.jp/kenko/biotech/research/biore Published 2002.

Bramucci et al. "Bacterial diversity in an industrial wastewater bioreactor" Appl. Biotechnol. (2003) 62:594-600.

Goode et al. "Effect of Calcium on Moving-Bed Biofilm Reactor Biofilms" Water Environment Research, vol. 83, No. 3, p. 220-232 (2011).

Hoage et al. "Innovation Aeration Retrofit of Existing Failed Septic Systems around Lake Livingston, Texas." Advanced Aeration, Inc. website. Published 2004.

Hoage et al. "Aeration Pretreatment for Commercial Restaurants." Advanced Aeration, Inc. website. Published 2006.

Hockin et al. "Linked Redox Precipitation of Sulfur and Selenium under Anaerobic Conditions by Sulfate-Reducing Bacterial Biofilms" Applied and Environmental Microbiology (2003) vol. 69, No. 12, p. 7063-7072.

Ibanez et al. "Potential of protonated alginate beads for heavy metals uptake" Hydrometallugry, 2002, vol. 64, pp. 89-99.

Jodra et al. "Ion Exchange Selectivies of calcium alginate gels for heavy metals," Water Sci. Technol., vol. 43, No. 2, 2001, pp. 237-244 (Abstract).

Kaprelyants et al. "Dormancy in Stationary-Phase Cultures of *Micrococcus luteus*: Flow Cytometric Analysis of Starvation and Resuscitation." Applied and Environmental Microbiology, Oct. 1993, vol. 59, No. 10, p. 3187-3196.

Lewandowski et al. "Heavy Metals Removal from Contaminated Water Solutions," HSRC The Great Plains/Rocky Mountain Hazardous Substance Research Center Jan. 25, 2005.

Lichtenberg et al. "A kinetic approach to bacterial adherence to hydrocarbon" Journal of Microbiological Methods, vol. 4, Nov. 1995, pp. 141-146.

Lowry "Comparison of Four Treatment Methods for the Removal of Lipids and Food Waste in a Grease Trap Environment." Advanced Aeration, Inc. website. Published 2004.

Nelson "Struvite precipitation in anaerobic swine lagoon liquid: effect of pH and Mg:P ratio and determination of rate constant." Bioresource Technology 89 (2003) 229-236.

Ogden et al. "Investigating the use of biosorption to treat copper CMP wastewater," www.micromagazine.com, Jul./Aug. 2001.

Okazaki et al. "Development of poly(vinyl alcohol) hydrogel for waste water cleaning. II. Treatment of N,N-dimethylformamide in waste water with poly(vinyl alcohol) gel with immobilized microorganisms" J. of Applied Polymer Science, vol. 58, 2243-2249 (1995), (Abstract).

Roheim "Low Cost Automated on Site Systems for Growing and Dispensing Vegetative Bacteria," available on the ECOBionics website. Published Jan. 20, 2005.

Uemoto et al. "Distribution of *Nitrosomonas europaea* and *Paracoccus denitrificans* Immobilized in Tubular Polymeric Gel for Nitrogen Removal" Applied and Environmental Microbiology, Feb. 2000, p. 816-819, vol. 66, No. 2.

Vyrides "Effect of fluctuations in salinity on anaerobic biomass and production of soluble microbial products (SMPs)" Biodegradation (2009) 20:165-175.

PCT Application No. PCT/US2007/063317, Search Report, Mailed Jan. 18, 2008.

PCT Application No. PCT/US2007/063317, Written Opinion, Mailed Jan. 18, 2008.

PCT Application No. PCT/US2007/063317, IPRP, Mailed Sep. 9, 2008.

PCT Application No. PCT/US2012/039373, Search Report, Mailed Dec. 10, 2012.

PCT Application No. PCT/US2012/039384, Search Report, Mailed Dec. 10, 2012.

PCT Application No. PCT/US2012/039393, Search Report, Mailed Dec. 10, 2012.

PCT Application No. PCT/US2012/039400, Search Report, Mailed Dec. 10, 2012.

Office Action issued on Jan. 14, 2008 for U.S. Appl. No. 11/368,282.
Office Action issued on Jan. 16, 2007 for U.S. Appl. No. 11/368,320.
Office Action issued on Jun. 21, 2007 for U.S. Appl. No. 11/368,320.
Office Action issued on Jan. 10, 2008 for U.S. Appl. No. 11/368,320.
Office Action issued on Oct. 15, 2008 for U.S. Appl. No. 11/367,762.
Office Action issued on May 4, 2009 for U.S. Appl. No. 11/367,762.
Office Action issued on Dec. 1, 2009 for U.S. Appl. No. 11/367,762.
Office Action issued on Aug. 20, 2010 for U.S. Appl. No. 11/367,762.
Office Action issued on Jan. 2, 2009 for U.S. Appl. No. 11/368,330.
Office Action issued on Jun. 17, 2009 for U.S. Appl. No. 11/368,330.
Office Action issued on Nov. 18, 2009 for U.S. Appl. No. 11/368,330.
Office Action issued on Jan. 12, 2009 for U.S. Appl. No. 11/368,319.
Office Action issued on May 26, 2009 for U.S. Appl. No. 11/368,319.
Office Action issued on Sep. 22, 2009 for U.S. Appl. No. 11/368,319.

* cited by examiner

METHOD FOR THE REMEDIATION OF SALT-CONTAINING WASTEWATER STREAMS

CROSS REFERENCE TO RELATED APPLICATIONS

This application is a continuation of U.S. patent application Ser. No. 13/479,993 filed May 24, 2012, now abandoned, which claims priority to U.S. Provisional Application No. 61/489,932 filed on May 25, 2011.

BACKGROUND OF THE INVENTION

1. Field of the Invention

The present invention generally relates to systems and methods for treating water. More particularly, the invention relates to the reduction of contaminants from wastewater using bacteria.

2. Description of the Relevant Art

Fresh water is the most important resource on planet Earth. The fact that about 2.5-3% of all water is fresh water, and of that only 0.3% is readily accessible to the human population. As the world's population continues to grow, competition for the available fresh water resources will increase and potentially spark armed conflict in areas with insufficient supplies. Areas within Africa, the Mid-East, and parts of the Far-East, particularly China; are probably the most vulnerable to fresh water shortages.

Most systems utilized to desalinate water sources require significant amounts of energy and maintenance as well as significant capital costs. Most technologies rely on multi-stage flash distillation and/or a series of membranes to desalinate water. As a result of utilizing these technologies, associated costs of water reclamation from can be prohibitive to the areas that are most susceptible to water shortages. As indicated earlier, maintenance issues are significant for MSF and membrane filtration systems. MSF is susceptible to scaling and corrosion and represent a major maintenance aspect. In the case of membrane filtration, increased operational costs, reduced efficiency, and membrane fouling are often the result of treating water with increased loads of salinity (specifically high levels of calcium and iron).

Since water is vital to all, it is necessary to develop technologies that can secure adequate supplies of fresh water. These technologies must be modular, portable, and reduce overall operational costs, while leaving a minimal impact to the area in which the technology is deployed. By implementing new technologies that take advantage of some inherent properties found within microorganisms, the volume of freshwater can be significantly increased throughout the world at much lower costs.

SUMMARY OF THE INVENTION

In an embodiment, a method of preparing bacteria capable of reducing contaminants in a wastewater stream includes treating bacteria in a succession of growth mediums that include increasingly higher concentrations of inorganic salts. Bacteria are contacted with a first growth medium that includes one or more inorganic salts. The concentration of inorganic salts in the first growth medium is at least 0.5% by weight. When contacted with the inorganic salt containing growth medium, a portion of the bacteria is unable to survive, due to intolerance with the inorganic salts in the growth medium. The remaining living bacteria represent those bacteria that can tolerate the increased inorganic salt concentration in the growth medium. Thus through evolutionary selection, normally freshwater bacteria may be modified to be tolerant of inorganic salts.

In an embodiments, the bacteria may be contacted with a second growth medium after contacting the bacteria with the first growth medium. The second growth medium includes one or more inorganic salts. The concentration of inorganic salts in the second growth medium is greater than the concentration of inorganic salts in the first growth medium. The bacteria may be further contacted with one or more additional growth mediums, wherein each successive growth medium comprises one or more inorganic salts, and wherein the concentration of inorganic salts in each successive growth medium is greater than the concentration of inorganic salts in the previous growth medium. This cycle may be repeated until the remaining bacteria are tolerant to inorganic salt concentrations used to treat wastewater having an inorganic salt concentration of greater than 0.5% by weight. The salt tolerant bacteria may be used to generate additional salt tolerant bacteria using a bacteria generator.

In some embodiments, a substrate is disposed in a bioreactor that includes a polymer substrate. In one embodiment, one or more of the salt conditioned bacteria include primary adherer bacteria that couple to the substrate and wherein one or more bacteria include secondary bacteria which couple to the primary adherer bacteria to form a biofilm. In some embodiments, the secondary bacteria are substantially unable to couple to the substrate. Examples of salt conditioned bacteria include one or more of the following: bacteria of the genus *Caulobacter*; bacteria of the genus *Enterobacter*; bacteria of the genus *Pseudomonas*; bacteria of the genus *Gordonia*; bacteria of the genus *Bacillus*; bacteria of the genus *Agrobacterium*; and bacteria of the genus *Zoogloea*.

In one embodiment, a method of treating a wastewater stream that includes one or more inorganic salts includes introducing the wastewater stream into a bioreactor. The bioreactor includes one or more substrates and one or more bacteria coupled to one or more of the substrate. The bacteria are conditioned bacteria that are capable of reducing contaminants in a wastewater stream comprising one or more inorganic salts at a concentration of at least 0.5% by weight. The method includes contacting the wastewater stream with the bacteria in the bioreactor. The method further includes removing at least a portion of the contacted wastewater stream from the bioreactor. The concentration of contaminants in the removed portion of the contacted wastewater stream is less than the initial concentration of contaminants in the wastewater stream. For example, a wastewater stream having an inorganic concentration of greater than about 0.5% by weight may be treated in a bioreactor by contacting the wastewater stream with the bacteria for a sufficient amount of time to remove organic contaminates and/or inorganic salts from the wastewater stream.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
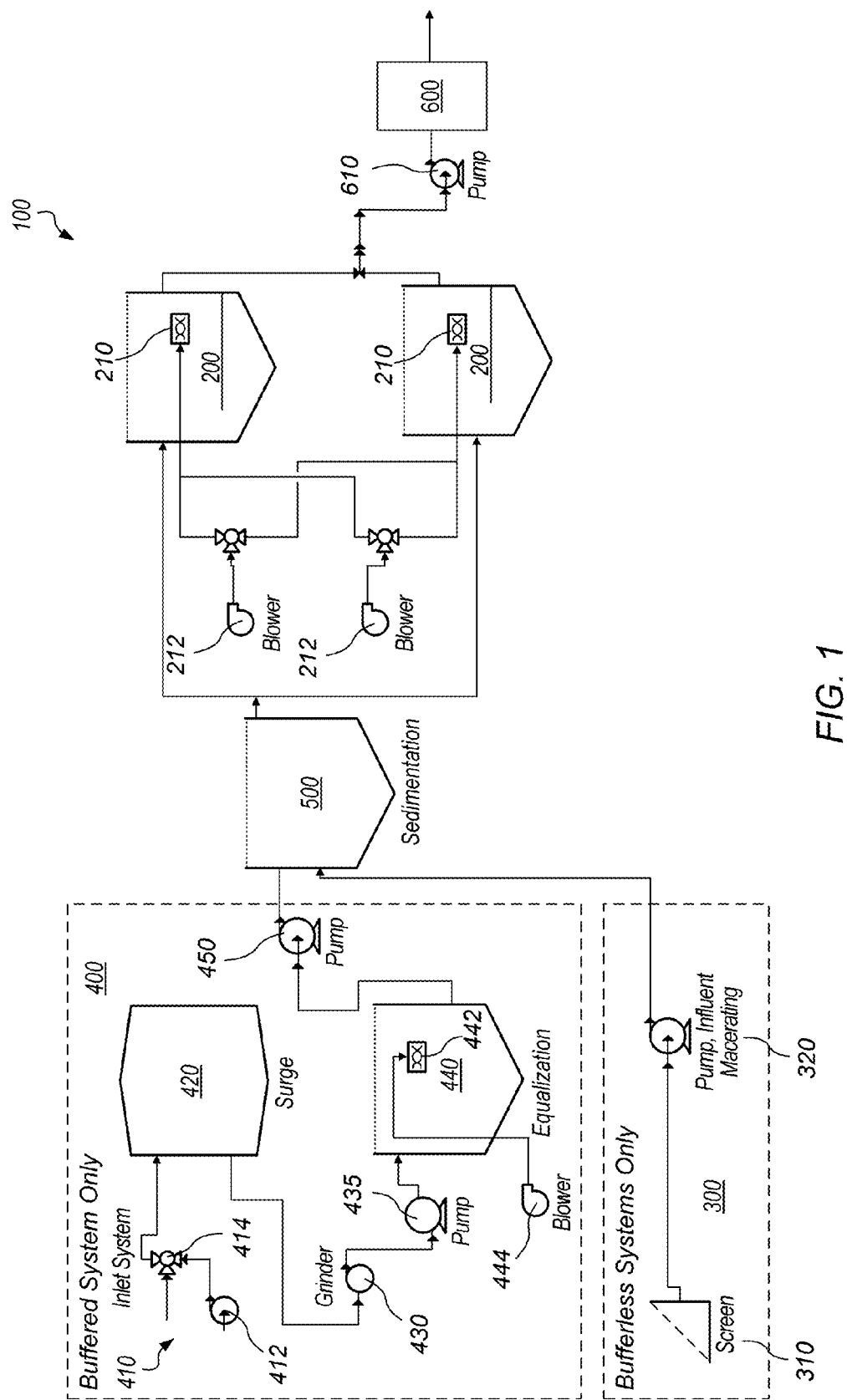
FIG. 1 depicts a schematic diagram of a wastewater treatment system.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

An "air source" refers to a device capable of providing air or other gasses to a liquid.

"Bacteria" refers to any member of the Bacteria Domain.

A "bacteria generator" refers to a device capable of allowing one or more bacteria to grow and/or reproduce.

A "biofilm" refers to a collection of more than one bacteria coupled together.

A "contaminant" refers to any unwanted substance or compound.

"Coupling" refers to attaching, bonding, adhering, welding, or a direct connection of two or more objects.

"Enteric bacteria" refers to bacteria that are found in the digestive tract of animals.

A "filament" refers to a portion of a bacterium that extends from the body of the bacterium.

"Foam" refers to an aggregate of gas bubbles formed in a liquid or solid. Foam in a liquid may suspend solid particles and inhibit settling of the solid particles to a bottom of a container.

A "footprint" refers to an area on a surface an object occupies.

"Gene-up regulation" refers to activation of a property of a bacterium after the bacterium couples to a substrate. For example, a gene may be activated, protein synthesis may occur, and/or metabolic activity may be increased or decreased during gene-up regulation of a bacterium.

A "heterotroph" is an organism that requires organic compounds as a carbon source for growth and development. A heterotroph is not able to use carbon dioxide as its sole carbon source.

A "hydrophobic substrate" refers to a substrate that does not form hydrogen bonds with itself, which causes it to at least partially repel water.

An "oligotroph" refers to an organism that can live in environments with a carbon concentration of less than 1 ppm.

An "organic compound" refers to a compound that includes carbon. An organic compound may include elements other than carbon, such as oxygen, nitrogen, sulfur, and/or metals.

"Primary adherer bacteria" refers to any member of the Bacteria Domain capable of coupling to a substrate and/or other bacteria.

"Stagnant regions" refers to areas that are not substantially flowing.

"Secondary adherer bacteria" refers to any member of the Bacteria Domain capable of coupling to other bacteria with a greater binding affinity than the binding affinity of the bacteria for a substrate.

"Reducing contaminants in water" refers to reducing an amount of contaminant in water, degrading contaminants, altering contaminants (e.g., altering a metal contaminant such that it precipitates), absorbing contaminants, immobilizing contaminants, and/or removing one or more contaminants from water.

"Wastewater" refers to a fluid comprising one or more contaminants. Contaminants include organic compounds, bacteria, and metal ions. Wastewater may also include solid inert materials such as undissolved polymeric materials, dirt, and sand.

In one embodiment, a waste treatment system includes one or more bioreactors. The wastewater treatment system further includes additional components that may assist in the transport of wastewater to the bioreactors. For example, a wastewater treatment system may include a generator, a filtration system, a control system, a power distribution system, a bacteria on-site fermenter, a primary settling tank, pumps, blower(s), air diffusers, one or more biofilm substrates, and sensors.

FIG. 1 depicts a schematic diagram of a wastewater treatment system 100. Wastewater treatment system 100 includes one or more bioreactors 200. One or more of bioreactors 200 include one or more substrates. In an embodiment, one or more bacteria disposed in bioreactor 200 at least partially adhere to one or more of substrates. During treatment of a wastewater stream, wastewater is introduced into one or more of bioreactors 200 and contacted with a biofilm formed on one or more substrates disposed within bioreactors 200. Interaction of the wastewater stream with bacteria present in bioreactor (e.g., bacteria coupled to a substrate) allows the bacteria to reduce contaminants in the wastewater stream.

Wastewater system 100 may be configured in different wastewater input configurations. For example, wastewater system may be configured for buffered or non-buffered wastewater input streams. For installations that include a customer supplied wastewater reservoir, a non-buffered input configuration may be used. In a non-buffered transfer system 300, wastewater stream is conducted to an influent filter 310. Influent filter 310 may be an influent screen which separates some of the solid matter from the wastewater stream. After passing through influent filter 310 the wastewater stream may be conducted to a grinding system 320. Grinding system 320 receives a wastewater stream that includes solid matter and reduces the size of the solid matter in the wastewater stream. Examples of a grinding system include, but are not limited to, grinders and macerating pumps. The resulting pretreated wastewater stream is passed, in some embodiments, to a sedimentation system 500, using a pump. In some embodiments, grinding system 320 includes a pump for transferring the wastewater through the grinding system and to sedimentation system 500 (e.g., using a macerating pump).

For those installations that lack sufficient infrastructure to provide a constant supply of wastewater for processing, a wastewater treatment system may include a buffer unit 400 that accepts wastewater from a number of sources with varying flow rates. In an embodiment, a buffer unit 400 includes an inlet system 410 that includes an influent pump 412 and an inlet bypass valve 414. Influent pump 412 may be used to pump an influent wastewater stream into a surge tank 420. For example, wastewater may be pumped into surge tank 420 from a holding basin/lift station. In some embodiments, an influent pump may not be required. In such embodiments, an influent bypass valve 414 may allow a wastewater stream to bypass influent pump 412. Bypass valve may be an electrically actuated valve. An influent pump may not be necessary if the wastewater stream is pressurized when it is conducted to the wastewater treatment system. For example, a holding tank (e.g., of a truck) may include a pump for sending wastewater out of the holding tank. Surge tank 420 collects wastewater and has a sufficient capacity to be able to provide a substantially constant supply of wastewater into the wastewater treatment system based on the frequency of wastewater delivery to the system.

Wastewater stored in surge tank 420 may be conducted to a grinding system 430. In some embodiments a buffer pump 435 may be coupled to grinding system to conduct the wastewater stream into an equalization tank 440. Equalization tank 440 may include one or more gas diffusers 442 coupled to blower 444. In some embodiments, oxygen may be added to wastewater held in equalization tank by sending air (e.g., using blowers 444) or oxygen (e.g., from a compressed oxygen source) into the equalization tank. Gas diffusers 442 may be coupled to the incoming oxygen source to disperse the incoming oxygen throughout the wastewater in equalization tank 440. Water may be transferred from equalization tank 440 to a sedimentation system 500, using transfer pump 450. Transfer pump 450 moves wastewater from equalization tank 440 to sedimentation system 500 at a controlled rate.

Sedimentation system 500 receives a waste stream from a buffer system 400 or from a non-buffered transfer system 300. Sedimentation system 500 removes at least a portion of solid material in the wastewater conducted to the sedimentation system to provide an at least partially clarified wastewater stream to the one or more bioreactors 200. The flow of wastewater through sedimentation system 500 is controlled, in part by either a pump in grinding system 300 (for non-buffered systems) or by transfer pump 450 (in buffered systems).

Bioreactors 200 may receive an at least partially clarified wastewater stream from sedimentation system 500. Bioreactors 200 include one or more substrates and one or more bacteria that at least partially adhere to the substrate. In some embodiments, oxygen may be added to the bioreactors by sending air (e.g., using blowers 212) or oxygen (e.g., from a compressed oxygen source) into the bioreactors. Gas diffusers 210 may be coupled to the incoming oxygen source to disperse the incoming oxygen throughout the wastewater in bioreactors 200.

Water may be transferred from bioreactors 200 to a purification system 600, using effluent transfer pump 610. Transfer pump 610 moves wastewater from bioreactors 200 to purification system 600 at a controlled rate. In one embodiment, purification system 600 may include a filtration system that receives an effluent stream from one or more of the bioreactors and produces a filtered water stream. In an embodiment, purification system 600 includes a metal removing system (e.g., an electrocoagulation system) that receives an effluent stream from one or more bioreactors and reduces the concentration of metal ions in the effluent stream. In some embodiments, refining system may include a filtration system and a metal removing system.

Figure 2:
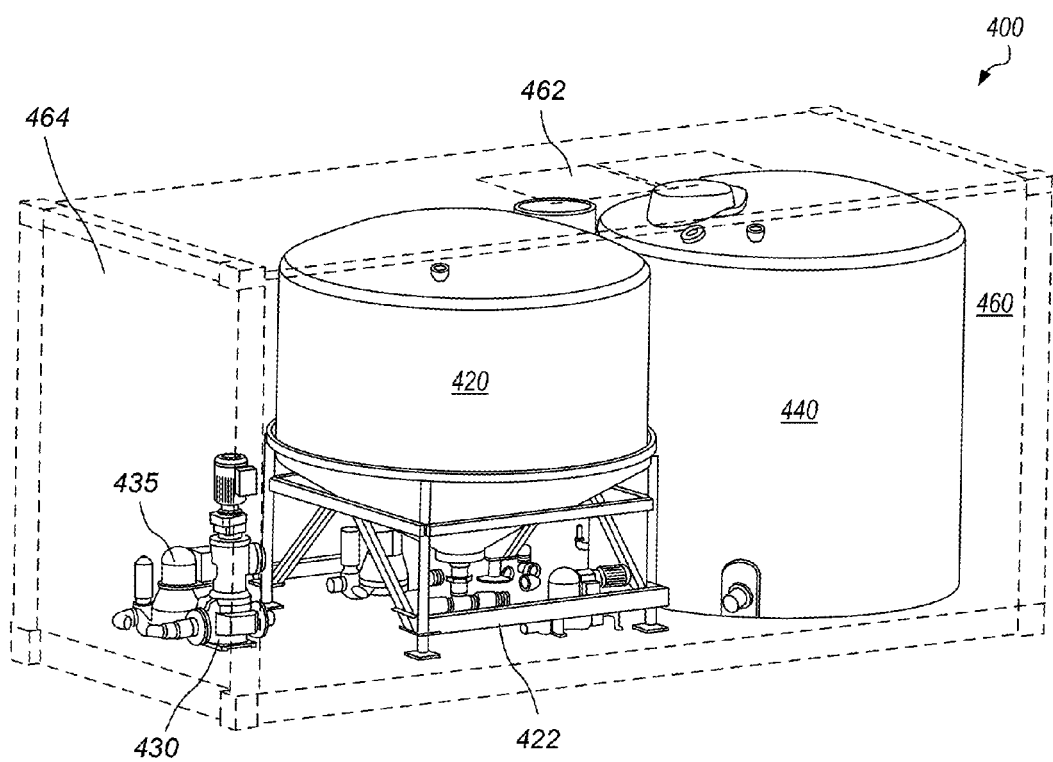
FIG. 2 depicts a projection view of a buffer system of a wastewater treatment system.

FIG. 2 depicts an embodiment of a buffer system 400. Buffer system 400 includes a surge tank 420 and an equalization tank 440. In some embodiments, buffer system 400 may be stored in a portable structure 460. For example, buffer system 400 may be stored in a high cube, 20' ISO container. As shown in FIG. 2, the components of buffer system 400 may be stored in a single portable structure. In some embodiments, portable structure 460 includes integral roof ports 462 and a side door 464 that allow for accessibility to the tanks and equipment within the structure.

Surge tank 420 may, in some embodiments, be a cone-bottom tank. Surge tank 420 is supported by a complementary frame 422 which allows access to the bottom. Use of a cone bottom tank will allow a preliminary separation of solids from the waste water stream. As wastewater enters surge tank 420, solids will collect in the bottom of the tank. Bottom access of surge tank 420 provides an access point for the removal of solid materials that collect on the bottom of the tank. Surge tank 420 is coupled to a wastewater inlet system 410 (depicted schematically in FIG. 1).

Buffer system 400 also includes an equalization tank 440. Equalization tank 440 may include an oxygen containing gas inlet 446. In some embodiments, oxygen may be added to wastewater held in equalization tank by sending air (e.g., using blowers 444) or oxygen (e.g., from a compressed oxygen source) into equalization tank 440 through oxygen containing gas inlet 446. Gas diffusers 442 may be coupled to the incoming oxygen containing gas inlet to disperse the incoming oxygen containing gas throughout the wastewater in equalization tank 440.

Together surge tank 420 and equalization tank 440 may provide storage of a sufficient amount of wastewater to allow substantially continuous operation of the wastewater treatment system. In some embodiments, buffer system 400 has a capacity of between about 3000 gallons to about 6000 gallons; or between about 3500 gallons to about 5000 gallon. In some embodiments, surge tank 420 has a lower capacity than equalization tank 440. In some embodiments, surge tank 420 has a capacity of between about 1000 gallons to about 2500 gallons, while equalization tank 440 has a capacity of between about 2000 gallons and about 3500 gallons.

Surge tank 420 may be coupled to equalization tank 440 through a grinding system 430 and an buffer pump 435. During use wastewater, collected in surge tank 420, may be passed into grinding system 430. Grinding system 430 receives a wastewater stream that includes solid matter and reduces the size of the solid matter in the wastewater stream. In an embodiment, grinding system 430 includes an in-line grinder. Buffer pump 435 is coupled to grinding system 430 to conduct wastewater from surge tank 440 through the grinding system to equalization tank.

Integral sensors for flow control and biological condition feedback may be mounted to surge tank 420 and/or equalization tank 440. Specifically, the tanks may incorporate one or more sensors, including, but not limited to fluid level sensors, dissolved oxygen sensors, and PH/oxidation reduction potential sensors, as depicted in FIG. 1. Electrical power and signal wires are distributed in the buffer unit container coupling the included sensors to a controller.

Buffer system 400 offers advantages over non-buffered wastewater delivery, even when a constant supply of wastewater is available. When non-buffered wastewater is delivered, the wastewater typically will have a higher solid level and a lower intrinsic oxygen level than wastewater delivered from a buffer system. The pretreated wastewater, obtained from a buffer system, will allow the bioreactors to operate more efficiently and for longer periods of time, due to the reduced amount of solids and the increased oxygen content.

Figure 3:
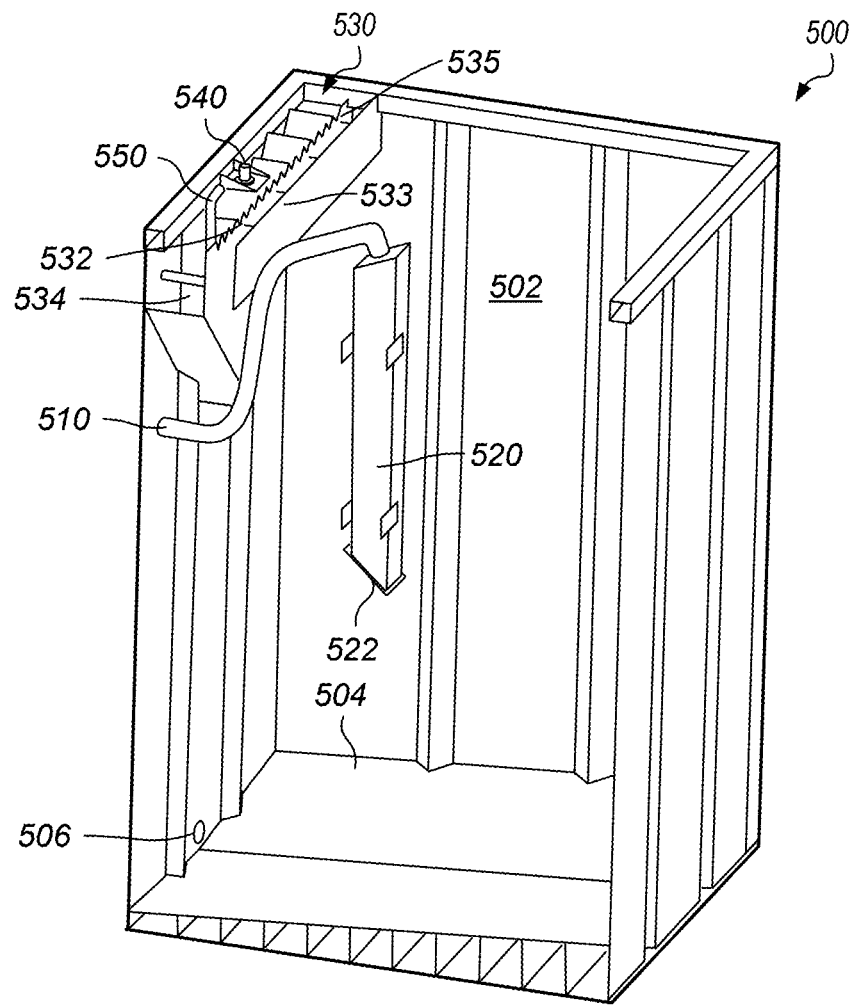
FIG. 3 depicts a partially open projection view of a sedimentation system of a wastewater treatment system.

A wastewater stream from a non-buffered source, or a pretreated wastewater stream from a buffer system, may be conducted into a sedimentation system 500. FIG. 3 depicts a partially open projection view of a sedimentation system 500. Sedimentation system 500 includes an inlet hose 510 coupled to an inlet conduit 520. Wastewater is introduced into sedimentation system through inlet hose 510 and into inlet conduit 520. Inlet conduit 520 includes an opening 522 through which the wastewater enters the sedimentation system body 502. Opening 522 is preferably positioned proximate to the lower half of the sedimentation system to ensure that the incoming wastewater is directed toward the bottom of body 502. The bottom of sedimentation system 500 includes a sloped floor 504. During use, solid material, that is carried into sedimentation system 500 in the wastewater, settles on sloped floor 504, which directs the solid material toward solids outlet 506. Sloped floor 504 helps to ensure that any solid material that settles out of the wastewater is directed toward the solids outlet 506. Sloped floor may have an approximately 10% to approximately 35% grade from horizontal. In an embodiment, sloped floor may have approximately 23% to approximately 27% grade from horizontal. Sedimentation system 200, in some embodiments, has a fluid capacity of between about 1000 gallons to about 2500 gallons.

Sedimentation system body includes an outlet system 530. Outlet system 530 includes a weir system 532 and an outlet conduit 534. Weir system 532 is configured to inhibit the passage of at least a portion of the solid matter in the wastewater from passing into the outlet conduit 534. Weir system 532 includes a first wall 533 and an opposing second wall 535. Together first wall 533 and second wall 535 define a conduit through which the wastewater introduced into body 502 passes. As shown in FIG. 3, first wall 533 and second wall 535 may extend only part way down the length of the body. This ensures that only wastewater that is near the top of body 502 enters the weir system. Thus, incoming wastewater is directed toward the bottom of body 502, forcing wastewater that has already been introduced to move toward the top of body 506 and weir system 532. The relatively narrow opening formed between first wall 533 and the second wall 535 ensures that a limited amount of wastewater enters weir system 532 during use. Wastewater entering weir system 532, passes through the conduit defined by first wall 533 and second wall 535 and over the second wall into outlet conduit 534. In some embodiments, first wall 533 extends to the roof of the body so that wastewater entering weir system 532 is inhibited from leaving the weir system. In one embodiment, second wall 535 includes a saw tooth upper surface, as depicted in FIG. 3. During use, wastewater passes through the conduit defined by first wall 533 and second wall 535 and over the saw tooth upper surface of the second wall into outlet conduit 534. A saw tooth upper surface on second wall 535 helps to improve sediment removal from the wastewater.

Sedimentation system also includes a fluid level sensor 540 to monitor the level of wastewater in the sedimentation system. Fluid level sensor 540 is coupled to a controller which is coupled to the transfer pump 450. Controller, in some embodiments, will control the flow rate of transfer pump 450, at least in part based on the fluid level in sedimentation system 500.

Figure 4:
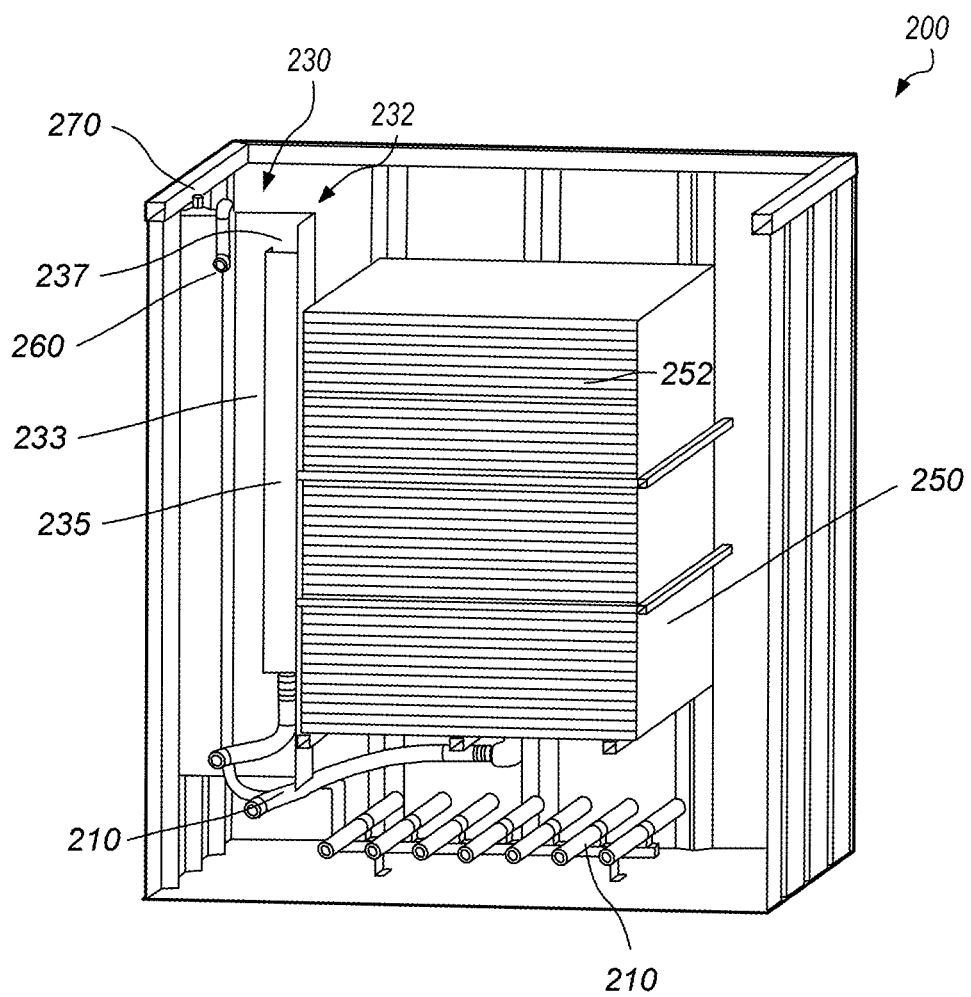
FIG. 4 depicts a partially open projection view of an embodiment of a bioreactor of a wastewater treatment system.

The at least partially clarified waster from produced from the sedimentation system is transferred to one or more bioreactors 200. FIG. 4 depicts a partially open projection view of an embodiment of a bioreactor 200. Bioreactor 200 includes one or more substrates 250 disposed in bioreactor 200. In an embodiment, one or more bacteria disposed in bioreactor 200 at least partially adhere to one or more of substrates. During treatment of a wastewater stream, wastewater is introduced into one or more of bioreactors 200 from sedimentation system 500 and contacted with a biofilm formed on one or more substrates 250 disposed within bioreactors 200. Interaction of the wastewater stream with bacteria present in bioreactor 200 (e.g., bacteria coupled to a substrate) allows the bacteria to reduce contaminants in the wastewater stream. Wastewater enters bioreactor 200 through an inlet hose 210 having an outlet positioned proximate to the bottom of the bioreactor body 202. In some embodiments, the outlet of inlet hose 210 is positioned below one or more substrates 250 to ensure that the incoming wastewater contacts one or more substrates. In some embodiments, bioreactor 200 has a fluid capacity of about 1500 gallons to about 5000 gallons.

Bioreactor 200 includes an outlet system 230. Outlet system 230 includes a weir system 232 and an outlet conduit 234. Weir system 232 is configured to inhibit the passage of at least a portion of the solid matter in the bioreactor from passing into the outlet conduit 234. Weir system 232 includes a first wall 233 and an opposing second wall 235. Together first wall 233 and second wall 235 define a weir conduit 237 through which the wastewater introduced into bioreactor 200 passes. The relatively narrow area defined by first wall 233 ensures that a limited amount of wastewater enters weir system 232 during use. A portion of the wastewater entering weir system 232, passes over first wall 233 and through the weir conduit 237 into outlet conduit 234. Only a portion of the wastewater that passes over the first wall enters weir conduit 237, the remainder of the wastewater passes through the weir system back into the reactor. In this manner, the reduction of contaminants in a wastewater stream can be maximized while maintaining a continuous flow.

In an embodiment, bioreactor 200 includes an oxygen containing gas inlet 260 which receives an oxygen containing gas. An oxygen containing gas may be air or oxygen obtained from a compressed gas source. An oxygen containing gas enters bioreactor 200 through oxygen containing gas inlet 260 and is conducted to one or more diffusers 210. The diffusers disperse the incoming oxygen containing gas throughout the bioreactor. In some embodiments, diffusers create bubbles of oxygen containing gas which are dispersed within bioreactor 200.

Bioreactor 200 includes one or more substrates. A substrate may be a structure on which a biofilm grows in a container. One or more substrates are fixed within a bioreactor 200. In some instances, one or more substrates are removably coupled to the bioreactor body to allow easy removal for cleaning or replacement of the substrate. A substrate may be formed of polymeric material, including, but not limited to, polyvinyl chloride (PVC), polyethylene, and polypropylene. Other materials such as metals and natural materials (e.g., cotton) may be used to form one or more of the substrates. In certain embodiments, the material selected to form the substrate may not substantially degrade in the presence of the wastewater to be treated. In some embodiments, the substrate is a ceramic substrate. For example, a substrate may include a plurality of porous ceramic rocks. The rocks may be constrained to a mechanism to build a colony, with respect to each other, such that a plurality of passages are defined by the rocks.

Figure 5:
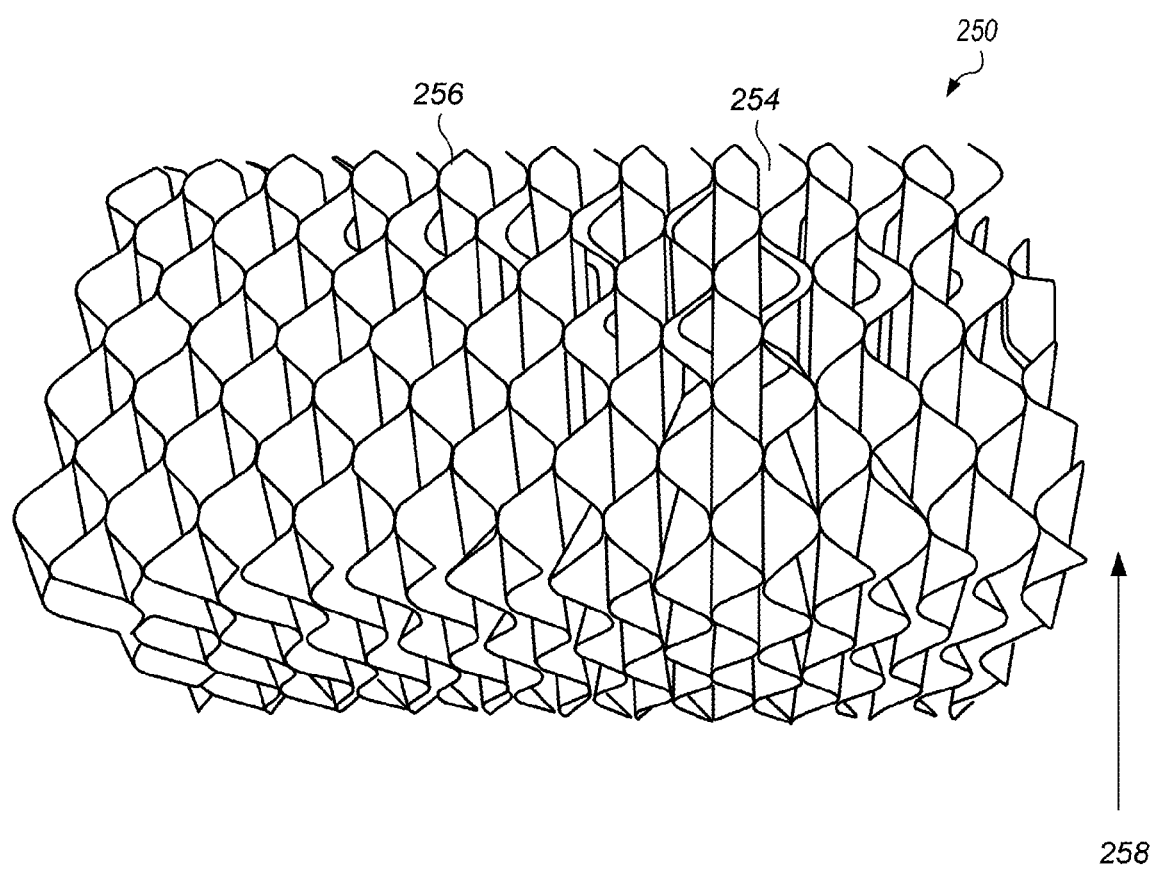
FIG. 5 depict a projection view of an embodiment of a substrate that includes a plurality of corrugated sheets.

A substrate may be planar, substantially cylindrical, substantially conical, substantially spherical, substantially rectangular, substantially square, substantially oval shaped, and/or irregularly shaped. In some embodiments, a substrate includes a plurality of sheets. For example, as depicted in FIG. 4, substrate 250 includes a plurality of sheets 252 oriented, with respect to each other, such that a plurality of passages 254 are defined by the sheets. In some embodiments, sheets 252 include a plurality of ridges and/or grooves. The sheets may be positioned proximate to each other such that the ridges and/or grooves are at least partially aligned to define a plurality of passages. FIG. 5 depict various views of an embodiment of a substrate that includes a plurality of corrugated sheets 256. In this embodiment, corrugated sheets 256 are at least partially aligned to define a plurality of passages 254 through the substrate. When disposed in a bioreactor, substrate 250, as depicted in FIG. 5, is oriented in the direction of flow arrow 258 to maximize the surface area in contact with the wastewater as it flows from the bottom of a bioreactor to the top of the bioreactor.

Bioreactor 200 includes a fluid level sensor 270 to monitor the level of wastewater in the bioreactor system. Fluid level sensor 270 is coupled to a controller which is coupled to the effluent transfer pump 610. Controller, in some embodiments, will control the flow rate of effluent transfer pump 610, at least in part based on the fluid level in bioreactor 200.

Figure 6:
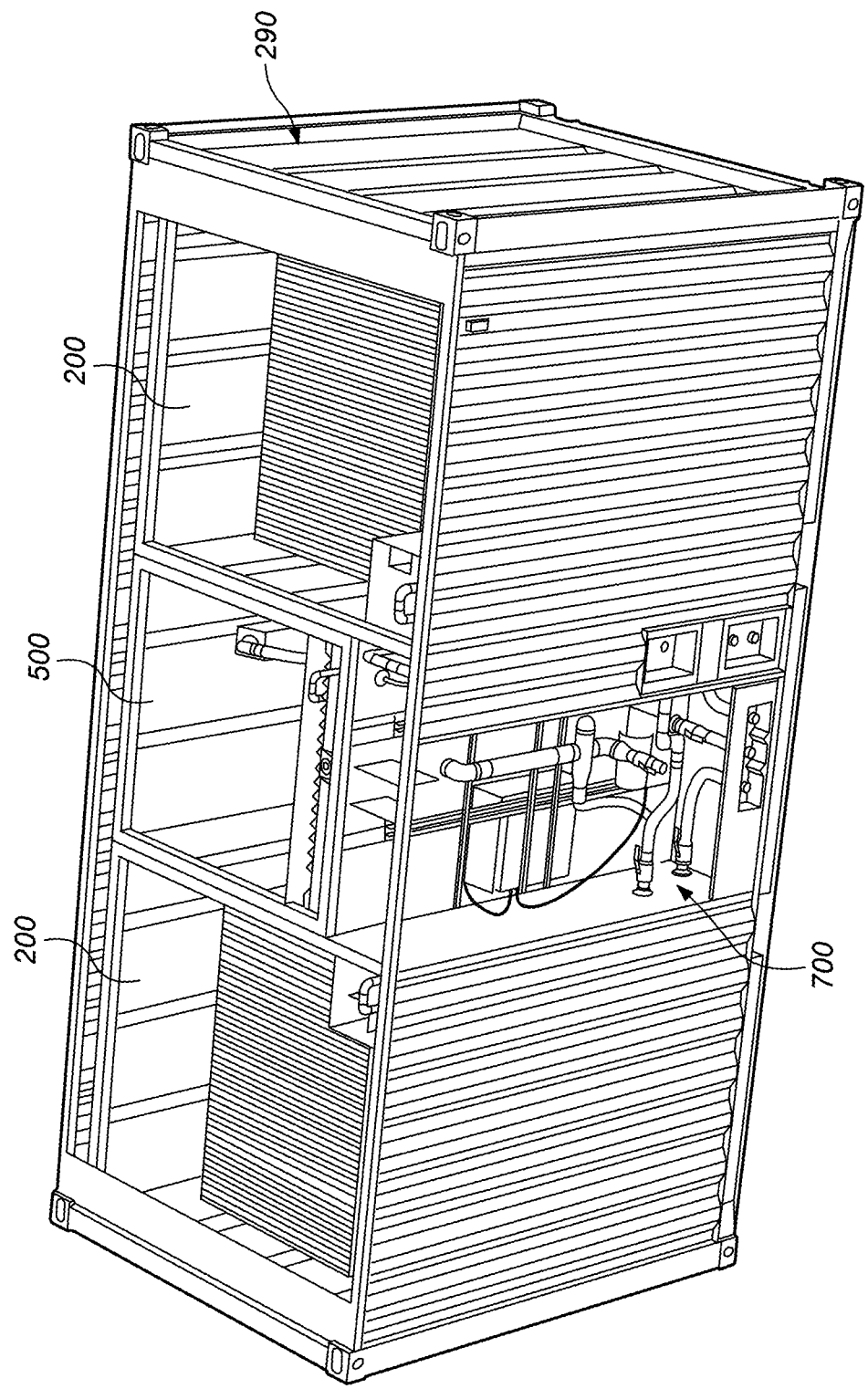
FIG. 6 depicts a partially open projection view of a portable structure that includes a pair of bioreactors and a sedimentation system.

In some embodiments, one or more bioreactors and one or more sedimentation systems may be stored in a portable structure. For example, one or more bioreactors and one or more sedimentation systems may be stored in a high cube, 20' ISO container. FIG. 6 depicts a portable structure that includes two bioreactors 200 and a sedimentation system 500. Sedimentation system 500 is coupled to the two bioreactors 200 through various plumbing connections disposed in control compartment 700. In some embodiments, portable structure 290 includes integral roof ports and one or more side doors that allow for accessibility to the tanks and equipment within the structure.

Figure 7:
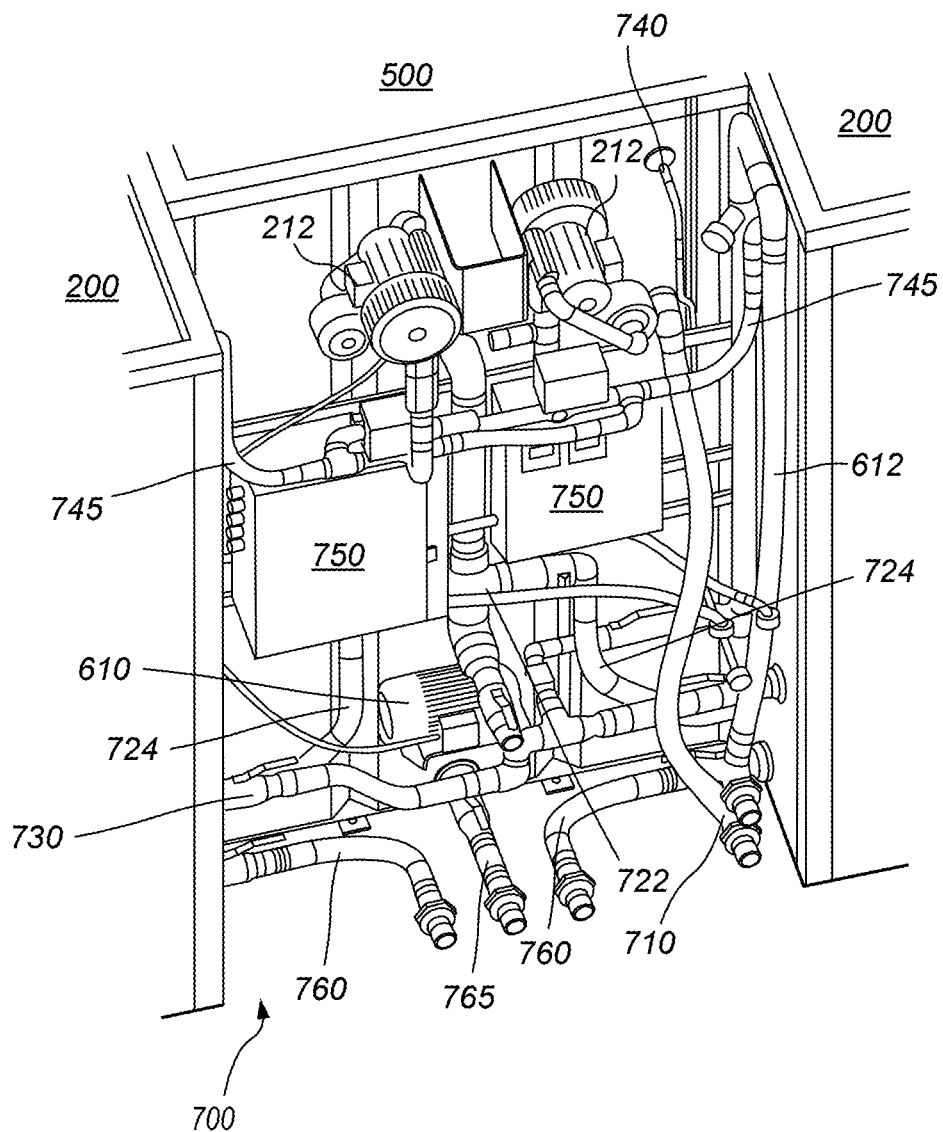
FIG. 7 depicts a projection view of a control compartment.

FIG. 7 depicts a projection view of control compartment 700. Components of control compartment 700 couple the two bioreactors 200 to sedimentation system 500. A wastewater inlet conduit 710 is disposed in control compartment 700. Wastewater inlet conduit 710 receives wastewater from a non-buffered wastewater source or from buffer system 400. Wastewater inlet conduit 710 is coupled to sedimentation system 500 such that the incoming wastewater is transferred directly into sedimentation system 500.

After being processed in sedimentation system 500, wastewater is transferred to sedimentation system outlet conduit 720. Sedimentation system outlet conduit 720 is coupled to connector 722 which directs flow of wastewater from sedimentation system 500 into the bioreactors 200 through bioreactor inlet conduits 724.

After wastewater is processed in bioreactors 200, an effluent stream from each bioreactor exits the bioreactors through bioreactor outlet conduits 730. Treated wastewater passes from bioreactors 200 to effluent transfer pump 610 which sends the treated wastewater out of the treatment system through effluent transfer conduit 612. Treated wastewater, in some embodiments, may be transferred to a purification system 600, as depicted in FIG. 1.

Bioreactors 200 and sedimentation system 500 need to be periodically drained of solid materials that settle during use. Bioreactor drain conduits 760 are coupled to the bottom of bioreactors 200 and allow solids and/or wastewater to be drained from the bioreactors. Sedimentation system drain conduit 765 is coupled to sedimentation system solids outlet 506. Sedimentation system drain conduit 765 allows solids and/or wastewater to be drained from the sedimentation system.

Control compartment 700 may also include additional components used to operate the sedimentation system and/or the bioreactors. For example, control compartment 700 may include a bacteria inlet conduit 740. During use, bacteria, produced in a bacteria generator, may be transferred into the treatment system (e.g., into the sedimentation system) through bacteria inlet conduit 740. In an embodiment, bacteria inlet conduit 740 is coupled to outlet conduit 534 of the sedimentation system. In this configuration, bacteria is added to the at least partially clarified wastewater stream produced in the sedimentation system and flows with the stream into the bioreactors. At least a portion of the bacteria added to the treatment system interacts with the substrate and/or bacteria coupled to the substrate to regenerate the biofilm.

Control compartment also includes effluent transfer pump 610, blowers 212 and electronic controllers 750. Blowers 212 provide compressed air to bioreactors 200 through conduits 745. Conduits 745 may be coupled to valves 747 which control the flow of compressed air from blowers 212 into bioreactors 200. In an embodiment, conduits 745 are configured to allow compressed air to b passed from either blower to either bioreactor, individually or simultaneously. Electronic monitoring devices such as DO sensor flow sensors, etc. that are disposed in either bioreactors 200 or sedimentation system 500 are coupled to electronic controllers 750. Electronic controllers may receive data from the sensor and communicate the information to a central controller.

The overall objectives of biological treatment of wastewater streams are to (1) transform (i.e., oxidize) dissolved and particulate biodegradable constituents into acceptable end products, (2) capture and incorporate suspended and non settleable colloidal solids into a biofilm, (3) transform or remove nutrients, such as nitrogen and phosphorus, and (4) in some cases, remove specific trace organic constituents and compounds.

In one embodiment, a wastewater treatment system utilizes physiologically active microorganisms that are in logarithmic growth stage and are capable of participating in a biofilm on a hydrophobic substratum. In an embodiment, a microbial consortium is utilized in a bioreactor for the treatment of wastewater. The microbial consortium utilized in embodiments of a wastewater system is designed such that specific bacterial strains contribute to different aspects of healthy biofilm formation. For example, certain bacteria may be selected for their ability to perform adhesion to a substrate, while others were selected on their ability to assist in intercellular adhesion.

The removal of dissolved and particulate carbonaceous material and the stabilization of organic matter found in wastewater is accomplished biologically using a variety of microorganisms, principally bacteria. Microorganisms are used to convert (e.g., oxidize) the dissolved and particulate carbonaceous organic matter into simple end products and additional biomass. Microorganisms may also be used to remove nitrogen and phosphorus in wastewater treatment processes. Specific bacteria are capable of oxidizing ammonia (nitrification) to nitrite and nitrate, while other bacteria can reduce the oxidized nitrogen to gaseous nitrogen. The organic material and nutrients are removed from the wastewater flowing past the biofilm. Aerobic heterotrophic bacteria are able to produce extracellular biopolymers that result in the formation of biofilms that can be separated from the treated liquid by gravity settling with relatively low concentrations of free bacteria and suspended solids. Because the biomass has a specific gravity slightly greater than that of water, the biomass can be removed from the treated liquid by gravity settling. It is important to note that unless the biomass produced from the organic matter is removed on a periodic basis, complete treatment has not been accomplished because the biomass, which itself is organic, will be measured as BOD in the effluent. Without the removal of biomass from the treated liquid, the only treatment achieved is that associated with the bacterial oxidation of a portion of the organic matter originally present.

The efficient removal of BOD is accomplished through the utilization of aerobic bacteria. The process requires sufficient contact time between the wastewater and heterotrophic microorganisms, and sufficient oxygen and nutrients. During the initial biological uptake of the organic material, more than half of it is oxidized and the remainder is assimilated as new biomass, which may be further oxidized by endogenous respiration. The small amounts of remaining solids are periodically removed. The solids are separated from the treated effluent by gravity separation as described above.

A wide variety of non-bacterial microorganisms are found in aerobic attached growth treatment process used for the removal of organic material. Protozoa also play an important role in aerobic biological treatment processes. By consuming free bacteria and colloidal particulates, protozoa aid effluent clarification. Protozoa require a longer solids retention time than aerobic heterotrophic bacteria, prefer dissolved oxygen concentrations above 1.0 mg/L, and are sensitive to toxic materials. Thus, their presence is a good indicator of a trouble-free stable process operation. Because of their size, protozoa can easily be observed with a light microscope at 100 to 200 magnification. Rotifers can also be found in biofilms, as well as nematodes and other multicellular microorganisms. These organisms occur at longer biomass retention times, and their importance has not been well defined. Aerobic attached growth processes have a complex microbial ecology.

In some embodiments, one or more bacteria may couple to a substrate in a container to form a biofilm. In an embodiment, bacteria forming the biofilm may not substantially slough off of the substrate, during use. The bacteria may be aerobic. Some of the bacteria may be oligotrophic, heterotrophic, enteric, and/or combinations thereof.

The bacteria may be capable of reducing contaminants in wastewater. In some embodiments, a biofilm may be capable of significantly reducing contaminants in water quickly. For example, wastewater may only have to reside in a container with the biofilm for less than 24 hours to significantly reduce an amount of contaminants in the wastewater.

One or more of the bacteria may reduce an amount of and/or degrade pesticides, industrial wastewater, wastewater from septic systems, and/or municipal wastewater. In some embodiments, one or more of the bacteria may reduce an amount of and/or degrade metal compounds and/or organic compounds such as alkanes, alkenes, aromatic organic compounds, and/or polychlorinated benzenes. Some bacteria may cleave long chain biopolymers into monomers, which other bacteria degrade. In an embodiment, bacteria may degrade at least a portion of organic compounds into at least carbon dioxide and water.

In some embodiments, a biofilm may include one or more primary adherer bacteria and/or one or more secondary adherer bacteria. Primary adherer bacteria may be capable of coupling to one or more substrates in a container and/or other bacteria. In certain embodiments, primary adherer bacteria may couple with a substrate such that the primary adherer bacteria are inhibited from being dislodged from the substrate during use. In an embodiment, primary adherer bacteria may irreversibly couple to a substrate.

Primary adherer bacteria may have longitudinal and latitudinal sides. In some bacteria, a longitudinal side may be longer than a latitudinal side or vice versa. Primary adherer bacteria may couple to bacteria and/or a substrate along a longitudinal and/or a latitudinal side. In an embodiment, a type of primary adherer bacteria may only couple to a substrate on one of its latitudinal sides. Another type of primary adherer bacteria may only couple to a substrate on one of its longitudinal sides. A shape and/or a density of a biofilm may be controlled by selecting one or more types of primary adherer bacteria that have a preference for coupling with substrate along a specific side.

In some embodiments, primary adherer bacteria may include a stalk. For example, bacteria in the genus *Caulobacter* have a stalk. A stalk may be narrower than the body of the primary adherer bacteria. A stalk may be capable of coupling to inanimate objects. An end of a stalk of a primary adherer bacteria maybe couple to an inanimate object, such as a substrate, but not couple to bacteria. For example, an end of a stalk of a primary adherer bacteria may include a holdfast, such as a sugar based holdfast, which allows the end of the stalk to bind with a substrate.

In an embodiment, a stalk may grow. A stalk of a primary adherer bacteria may be capable of growing from about 5 nm to about 200 nm. It may be advantageous to utilize a bacteria capable of extending a biofilm. If a food source is not plentiful proximate primary adherer bacteria with stalks, the stalks may grow to position the primary adherer bacteria in another region of the fluid with a greater food source.

Primary adherer bacteria may include one or more filaments, such as organelle, capable of coupling with other bacteria. For example, bacteria in the genus *Gordonia* have several filaments. Some primary adherer bacteria may have filaments capable of coupling only with other types of bacteria (e.g., the filaments will not couple with the same primary adherer bacteria from the same genus).

In some embodiments, primary adherer bacteria may include bacteria from the class Actinobacteria Alphaproteobacteria, or combinations thereof. Primary adherer bacteria may include bacteria from the genus *Gordonia, Caulobacter,* or combinations thereof.

Secondary adherer bacteria may be capable of coupling with one or more other bacteria including primary adherer bacteria. In some embodiments, secondary adherer bacteria may not be capable of coupling to a substrate. In an embodiment, secondary adherer bacteria may include bacteria from the class Bacilli, Gammaproteobacteria, Betaproteobacteria, or combinations thereof. Secondary adherer bacteria may include bacteria from the genus *Bacillus, Pseudomonas, Zoogloea, Enterobacter*, or combinations thereof.

Primary adherer bacteria and/or secondary adherer bacteria may be capable of reducing contaminants in water. Secondary adherer bacteria may be capable of reducing a greater amount of one or more types of contaminants than one or more of the primary adherer bacteria. In some embodiments, sessile bacteria may experience gene-up regulation that increases the metabolic activity of the sessile bacteria. Sessile bacteria may have a metabolic activity four times the metabolic activity of planktonic bacteria. Primary adherer bacteria may experience gene-up regulation of metabolic activity due to their attachment to a substrate and/or secondary adherer bacteria may experience gene-up regulation due to their attachment to other bacteria. In an embodiment, sessile primary adherer bacteria may experience greater gene-up regulation of metabolic activity that sessile secondary adherer bacteria.

In some embodiments, bacteria provided to a container may be selected to reduce specific contaminants. Bacteria may be selected for their ability to withstand a pre-determined amount of a contaminant, such as 100 ppm of aromatic organic compound, and/or fluctuations in pH. For example, bacteria selected may include bacteria from the genus *Enterobacter, Pseudomonas, Gordonia, Bacillus, Agrobacterium, Caulobacter*, and/or *Zoogloea*. The biofilm may include bacteria in the genus *Nocardia, Thiothrix* or *Beggiatoa*. In an embodiment, a biofilm may include *Enterobacter cloacae, Pseudomonas putida, Pseudomonas stutzeri, Gordonia* sp., *Bacillus subtilis, Agrobacterium* sp., *Caulobacter vibrioides, Caulobacter crescentus*, and/or bacteria in the genus *Zoogloea*. In another embodiment, a biofilm may be formed from a combination of bacteria, such as FreeFlow®, commercially available from NCH Corp (Irving, Tex.).

In some embodiments, the biofilm may include bacteria of the phylum Actinobacteria phy. nov., class Actinobacteria, subclass *Actinobacteridae*, order Actinomycetales, suborder *Corynebacterineae*, family Gordoniaceae, and/or genus *Gordonia*. In some embodiments, bacteria in the genus *Gordonia* may have filaments. The filaments may be capable of binding with a substrate and/or other bacteria. The filaments may promote formation of a more even biofilm. Bacteria in the genus *Gordonia* may be capable of degrading one or more organic compounds, such as benzene, toluene, ethylbenzene, o-xylene, p-xylene, and/or m-xylene. In some embodiments, a biofilm including bacteria in the genus *Gordonia* may be capable of degrading rubber compounds, desulphurize aromatics, and/or degrade pyridine compounds. Bacteria in the genus *Gordonia* may be capable of removing sulfur from petrochemical products. In an embodiment, bacteria in the genus *Gordonia* may produce biosurfactants that facilitate remediation and/or degradation of organic and metal-based contamination. Biosurfactants may assist in the solubilization of various pollutants and/or allow bacteria to more rapidly uptake pollutants for degradation or immobilization.

Bacteria in the genus *Gordonia* may go into a state of latency during periods of stress, introduction of a toxin, nutrient deprivation, and/or oxygen deprivation. Bacteria in the genus *Gordonia* may be capable of reviving out of the state of latency once the environment becomes conducive to the bacteria. It may be advantageous to utilize bacteria capable of going into a latent state and reviving, so that bacteria in a biofilm may not die if the environment, such as in a bioreactor, changes significantly.

Bacteria in the genus *Gordonia* may cause foaming in wastewater treatment systems. However, when bacteria in the genus *Gordonia* are coupled to a substrate, foaming is inhibited and gene-up regulation occurs causing the bacteria to be capable of reducing contaminants from water. The phenomena of bacteria possessing a greater ability to degrade and/or reduce contaminants more efficiently when bound (e.g., gene-up regulation) is not limited to bacteria in the genus *Gordonia* but is present in several types of bacteria. Using bacteria with increased contamination reduction abilities when bound allows formation of a more stabile biofilm (e.g., since bacteria are coupled to the substrate) and/or a more efficient biofilm.

In some embodiments, the biofilm may include bacteria of the phylum Proteobacteria phy. nov., class Alphaproteobacteria, order Caulobacterales, family Caulobacteraceae, and/or genus *Caulobacter*. Bacteria in the genus *Caulobacter* may convert heavy metals such as mercury, copper, cadmium, and cobalt in aqueous solutions into chemical forms that are less toxic, less soluble, and/or precipitate out of solution. Some bacteria in the genus *Caulobacter* have resistance to some antibiotics such as chloramphenicol, tetracycline, erythromycin, and tobomycin. Resistant bacteria may be from plasmid transfer between antibiotic resistant intestinal or human associated bacteria found in wastewater and bacteria in the genus *Caulobacter*.

Bacteria in the genus *Caulobacter* are oligotrophs and may be capable of surviving in low carbon concentration environments. In some embodiments, bacteria in the genus *Caulobacter* may be capable of forming a uniform biofilm due to the bacteria shape. Bacteria in the genus *Caulobacter* have a motile stage characterized by a swarmer cell and a sessile stage characterized by a stalk shaped cell. The stalks of the bacteria in the genus *Caulobacter* may grow. It may be desirable to use a bacteria with a growing stalk since the bacteria may be better able to survive changes in environment. For example, if nutrients proximate a bacterium's location are depleting, then the stalk of the bacterium in the genus *Caulobacter* may grow and the bacterium can be positioned in a new location with a more nutrients.

While some bacteria are capable of forming a biofilm through the secretion of polysaccharides, bacteria in the genus *Caulobacter* may be capable of forming a biofilm using a stalk. In an embodiment, using bacteria with stalks may allow the creation of a more uniform biofilm when compared with a biofilm formed without the use of bacteria with filaments. For example, a biofilm may be formed of a first layer including bacteria in the genus *Caulobacter* and one or more other layers coupled to the bacteria in the genus *Caulobacter*.

The stalks may be capable of coupling to the substrate but may not be capable of coupling to other bacteria. In an embodiment, bacteria in the genus *Caulobacter* may only couple with a substrate at the holdfast at an end of its stalk.

In an embodiment, bacteria in the genus *Caulobacter* are capable of frequently entering and exiting a stationary phase. It may be desirable to utilize bacteria capable of entering and exiting the stationary phase, because the bacteria may be more durable and/or capable of surviving environments with fluctuations in levels of nutrients.

In some embodiments, the biofilm may include bacteria of the phylum Proteobacteria phy. nov., class Gammaproteobacteria, order Enterobacteriales, family Enterobacteriaceae, and/or genus *Enterobacter*. Bacteria in the genus *Enterobacter* may be enteric, anaerobic, and a heterotroph. Bacteria in the genus *Enterobacter* may produce hydrogen when metabolizing organic compounds. Bacteria in the genus *Enterobacter* may be capable of degrading aromatics, such as 2,4,6-trinitrotoluene that is commonly found in wastewater produced in munitions production. Bacteria in the genus *Enterobacter* may be capable of degrading nitrate esters, such as pentaerythritol tetranitrate and glycerol trinitrate.

In some embodiments, the biofilm may include bacteria of the phylum Firmicutes phy. nov., class Bacilli, order Bacillales, family Bacillaceae, and/or genus *Bacillus*. Bacteria in the genus *Bacillus* may be good oligotrophs and capable of surviving in an environment with a low concentration of organic compounds. Bacteria in the genus *Bacillus* may be capable of degrading organic compounds, such as organic compounds produced from plant and animal sources (e.g., cellulose, starch, pectin, proteins, hydrocarbons). In an embodiment, a biofilm including bacteria in the genus *Bacillus* may cleave long chain biopolymers into monomers that are degradable by other bacteria. Bacteria in the genus *Bacillus* may be cable of nitrification, denitrification, and/or nitrogen fixation. Bacteria in the genus *Bacillus* may be capable of fermenting carbohydrates, producing glycerol and butanediol, producing enzymes for utilization in detergents, paralyzing insects, degrading biopolymers, and/or synthesis for use in industrial processes such as the production of antibiotics.

In some embodiments, it may be desirable to utilize bacteria in the genus *Bacillus* to create a biofilm capable of surviving in harsh environments. Bacteria in the genus *Bacillus* may produce spores that are highly resistant to stressful environments and/or toxic environments. Bacteria in the genus *Bacillus* may synthesize antibiotics that kill proximate bacteria and cause the dead bacteria to lyse and release their contents. Bacteria in the genus *Bacillus* may absorb the nutrients released by the ruptured cells. This process may require less energy than forming spores.

In some embodiments, the biofilm may include bacteria of the phylum Proteobacteria phy. nov., class Gammaproteobacteria, order Pseudomonadales, family Pseudomonadaceae, and/or genus *Pseudomonas*. Bacteria in the genus *Pseudomonas* may be good heterotrophs. Bacteria in the genus *Pseudomonas* may be capable of degrading organic compounds, such as trichloroethylene. In an embodiment, bacteria in the genus *Pseudomonas* may degrade monomer organic compounds. Bacteria in the genus *Pseudomonas* may be capable of degrading aromatic organic compounds such as toluene, xylene, naphthalene, or polynuclear aromatic organic compounds. In certain embodiments, bacteria in the genus *Pseudomonas* may prefer to degrade simple organic compounds when compared to other organisms.

In some embodiments, it may be desirable to include bacteria in the genus *Pseudomonas* in a biofilm since they are capable of withstanding fluctuations in environment. Bacteria in the genus *Pseudomonas* may produce o-acetylated alginate that encapsulates the bacteria to protect the bacteria from stressful environments. Bacteria in the genus *Pseudomonas* may have filaments. The filaments may help bacteria in the genus *Pseudomonas* to attach to substrates and/or other organisms. The filaments and production of alginate by bacteria in the genus *Pseudomonas* may promote formation of a biofilm and/or formation of a biofilm coupled to a substrate.

In certain embodiments, the biofilm may include bacteria of the phylum Proteobacteria phy. nov., class Betaproteobacteria, order Rhodocyclales, family Rhodocyclaceae, and/or genus *Zoogloea*. Bacteria in the genus *Zoogloea* may be a good heterotroph. Bacteria in the genus *Zoogloea* may be capable of degrading high concentrations of proteins. Bacteria in the genus *Zoogloea* may produce exopolysaccharide that contributes to the ability of a biofilm containing bacteria in the genus *Zoogloea* to tolerate fluctuating, stressful, and/or toxic environments.

In various embodiments, the biofilm may include bacteria of the phylum Actinobacteria phy. nov., class Actinobacteria, order Actinomycetales, suborder Corynebacterineae, family Nocardiaceae, and/or genus *Norcardia*; bacteria of the phylum Proteobacteria phy. nov., class Gamma proteobacteria, order Thiotrichales, family Thiotrichaceae, and/or genus *Thiothrix*; and/or bacteria of the phylum Proteobacteria phy. nov., class Gamma proteobacteria, order Thiotrichales, family Thiotrichaceae, and/or genus *Beggiatoa*. Bacteria of the suborder Corynebacterineae and bacteria of the family Thiotrichaceae may have similar behavior. For example, both may experience gene-up regulation of metabolic activity when attached to a substrate. In an embodiment bacteria of the suborder Corynebacterineae and bacteria of the family Thiotrichaceae may cause foaming in a container when planktonic.

Bacteria in that have been traditionally used for the treatment of wastewater are typically intolerant of wastewater with inorganic salt concentrations greater than about 0.5% by weight. For example, bacteria of the genus *Caulobacter*, the genus *Enterobacter*, the genus *Pseudomonas*, the genus *Gordonia*, the genus *Bacillus*, the genus *Agrobacterium*, and the genus *Zoogloea* are typically unable to tolerate high inorganic salt concentrations. Since many wastewater streams produced during the production of natural resources contain a high concentration of inorganic salts, it has been, traditionally, unfeasible to use biological purification systems to treat these wastewater streams.

In an embodiment, a method of preparing bacteria capable of reducing contaminants in a wastewater stream includes treating bacteria in a succession of growth mediums that include increasingly higher concentrations of inorganic salts. The phrase "salt conditioned bacteria" as used herein refers to bacteria that have been cultured using a succession of growth mediums that include increasingly higher concentrations of inorganic salts. Bacteria are contacted with a first growth medium that includes one or more inorganic salts. The concentration of inorganic salts in the first growth medium is at least 0.5% by weight. When contacted with the inorganic salt containing growth medium, a portion of the bacteria is unable to survive, due to intolerance with the inorganic salts in the growth medium. The remaining living bacteria represent those bacteria that can tolerate the increased inorganic salt concentration in the growth medium. Thus through evolutionary selection, normally freshwater bacteria may be modified to be tolerant of inorganic salts.

In an embodiments, the bacteria may be contacted with a second growth medium after contacting the bacteria with the first growth medium. The second growth medium includes one or more inorganic salts. The concentration of inorganic salts in the second growth medium is greater than the concentration of inorganic salts in the first growth medium. The bacteria may be further contacted with one or more additional growth mediums, wherein each successive growth medium comprises one or more inorganic salts, and wherein the concentration of inorganic salts in each successive growth medium is greater than the concentration of inorganic salts in the previous growth medium. This cycle may be repeated until the remaining bacteria are tolerant to inorganic salt concentrations used to treat wastewater having an inorganic salt concentration of greater than 0.5% by weight. The salt tolerant bacteria may be used to generate additional salt tolerant bacteria using a bacteria generator.

Typical inorganic salts that may be used during the bacteria conditioning process include, but are not limited to: sodium salts (e.g., sodium chloride, sodium bromide, sodium fluoride, sodium borate, sodium sulfate, sodium carbonate, and sodium bicarbonate); calcium salts (e.g., calcium chloride, calcium bromide, calcium fluoride, calcium borate, calcium sulfate, calcium carbonate, and calcium bicarbonate); magnesium salts (e.g., magnesium chloride, magnesium bromide, magnesium fluoride, magnesium borate, magnesium sulfate, magnesium carbonate, and magnesium bicarbonate); and potassium salts (e.g., potassium chloride, potassium bromide, potassium fluoride, potassium borate, potassium sulfate, potassium carbonate, and potassium bicarbonate). In some embodiments, one or more inorganic salts in the first growth medium are also present in the second and other successive growth mediums.

In one embodiment, the inorganic salt concentration in the first growth medium is between about 0.5% and about 3.0% and the inorganic salt concentration in the second growth medium is greater than about 3.0%. When a series of growth mediums are used the concentration of inorganic salts in the final growth medium used is greater than 8.5% and at most 12% by weight.

Using this method bacteria of the genus *Caulobacter*; bacteria of the genus *Enterobacter*; bacteria of the genus *Pseudomonas*; bacteria of the genus *Gordonia*; bacteria of the genus *Bacillus*; bacteria of the genus *Agrobacterium*; and bacteria of the genus *Zoogloea* may be conditioned, either individually or collectively, to be tolerant of wastewater streams having an inorganic salt concentration of greater than about 0.5% by weight. Bacteria conditioned using this method may be tolerant of wastewater streams having an inorganic salt concentration of between about 0.5% by weight to about 12% by weight; of between about 3% by weight to about 12% by weight; and between about 5% by weight and about 12%. Bacteria conditioned using this method may be tolerant of wastewater streams having an inorganic salt concentration of greater than about 0.5% by weight, greater than about 1% by weight, greater than about 3% by weight, greater than about 5% by weight, or greater than about 8% by weight. In some embodiments, bacteria conditioned using this method may be tolerant of wastewater streams having an inorganic salt concentration of up to about 12% by weight.

In an embodiment, a method of preparing bacteria capable of reducing contaminants in a wastewater stream includes treating bacteria in a succession of growth mediums that include increasingly higher concentrations of inorganic salts. In one embodiment, bacteria is coupled to a substrate. The bacteria may be coupled directly to a substrate (e.g., when primary adherer bacteria are being conditioned) or indirectly as a biofilm (e.g., secondary adherer bacteria coupled to primary adherer bacteria. The bacteria on the substrate are contacted with a first growth medium that includes one or more inorganic salts. The concentration of inorganic salts in the first growth medium is at least 0.5% by weight. When contacted with the inorganic salt containing growth medium, a portion of the bacteria that is coupled to the substrate is unable to survive, due to intolerance with the inorganic salts in the growth medium. The remaining living bacteria represent those bacteria that can tolerate the increased inorganic salt concentration in the growth medium. Thus through evolutionary selection, normally freshwater bacteria may be modified to be tolerant of inorganic salts.

In an embodiments, the bacteria on the substrate may be contacted with a second growth medium after contacting the bacteria on the substrate with the first growth medium. The second growth medium includes one or more inorganic salts. The concentration of inorganic salts in the second growth medium is greater than the concentration of inorganic salts in the first growth medium. The bacteria on the substrate may be further contacted with one or more additional growth mediums, wherein each successive growth medium comprises one or more inorganic salts, and wherein the concentration of inorganic salts in each successive growth medium is greater than the concentration of inorganic salts in the previous growth medium. This cycle may be repeated until the remaining bacteria are tolerant to inorganic salt concentrations used to treat wastewater having an inorganic salt concentration of greater than 0.5% by weight. The salt tolerant bacteria may be removed from the substrate and used to generate additional salt tolerant bacteria using normal growth media.

Bacteria that is tolerant of wastewater streams having an inorganic salt concentration of greater than about 0.5% by weight may be used in a wastewater treatment system, as described herein, to reduce the amount of contaminants in the wastewater stream. In some embodiments, bacteria that is tolerant of wastewater streams having an inorganic salt concentration of greater than about 0.5% by weight have also been found to reduce the concentration of inorganic salts in the wastewater stream. This unexpected property of the conditioned bacteria makes such bacteria particularly useful for the treatment of wastewater streams obtained from natural resource production operations.

As a result of maintaining microorganisms in a culture medium with a high load of dissolved salts, the microorganisms may be introduced into water obtained from natural resources that contain dissolved salts up to 12.0%. The microorganisms were found to remain viable, and are capable of degrading multiple organic pollutants, as well as facilitate the biomineralization of various cationic (alkali metals, alkaline earth metals, transition metals, basic metals) and anionic species.

The salt conditioned bacteria, therefore, provide an operator an economical solution for producing freshwater from sources containing elevated levels of dissolved salts. If higher quality water is necessary for human consumption or agricultural applications, other commercially available technologies can be integrated into the system such as a variety or combination of filters (microfiltration, ultrafiltration, nanofiltration) or reversed osmosis membranes. As indicated earlier, when membrane filtration systems are fed the effluent from a bioreactor, the filtration systems produce a higher quality permeate with less reject. The system may also be equipped with a metal removing system that allows for the removal of strontium, barium, iron, magnesium, and many other inorganic as well as some organic molecular compounds. The metal removing system allows for further polishing of the effluent, and removal of heavy metals that are potentially damaging to the environment and hazardous to human consumption if mixed in the water table.

Microorganisms have been adapted to survive in water with a concentration of dissolved salts up to 12%. Other biological systems currently available are incapable of treating water with levels of salinity that are greater than 0.5%. The biofilm also facilitates the mineralization of metals through either direct or indirect processes. Evidence suggest that the possible mechanism of inorganic salt removal is mediated through compounds released by the microorganisms. These compounds include but are not limited to sideraphores, catecholates, hydroxamates, and various organic acids that have the capability to bind various cationic species. However the possibility of direct/indirect mineralization through biomineralization is also possible. As a result of mineralizing/binding the metals, the total conductivity of the water is reduced. Membrane filtration systems have upper limits of salinity in which the operation remains cost effective. Since the biological treatment process is capable of reducing conductivity, as well as many of the cationic species that contribute to increased membrane pressure, the new process described here allows for currently available technologies to operate more efficiently.

In some embodiments, one or more bacteria generators may provide one or more of the bacteria that form, supplement, and/or replenish the biofilm in a container. A bacteria generator may be a container capable of incubating one or more types of bacteria. In one embodiment, bacteria generator may produce more than one type of bacteria simultaneously. In other embodiments, a system may include a plurality of bacteria generators, one bacteria generator for each strain or set of strains of bacteria that form the biofilm. Bacteria generators may be BioAmp® typy bacteria generators, commercially available from NCH Corp (Irving, Tex.). Bacteria generators may include one or more nutrient sources and/or be coupled to one or more containers such that bacteria from the bacteria generator is provided to the container. Bacteria generator may be capable of producing a predetermined amount of bacteria in less than 48 hours. In an embodiment, bacteria generator may be capable of producing a predetermined amount of bacteria in less than 24 hours. In an embodiment, bacteria generator may facilitate rapid formation of a biofilm in a bioreactor, since bacteria can be supplied to the biofilm to supplement growth of the bacteria in the bioreactor. Bacteria generator may be capable of producing different combinations and/or ratios of bacteria during use. In addition, unlike many automated bacteria incubators, the bacteria generator may be capable of inoculating the bacteria in the bacteria generator, as desired.

Figure 8:
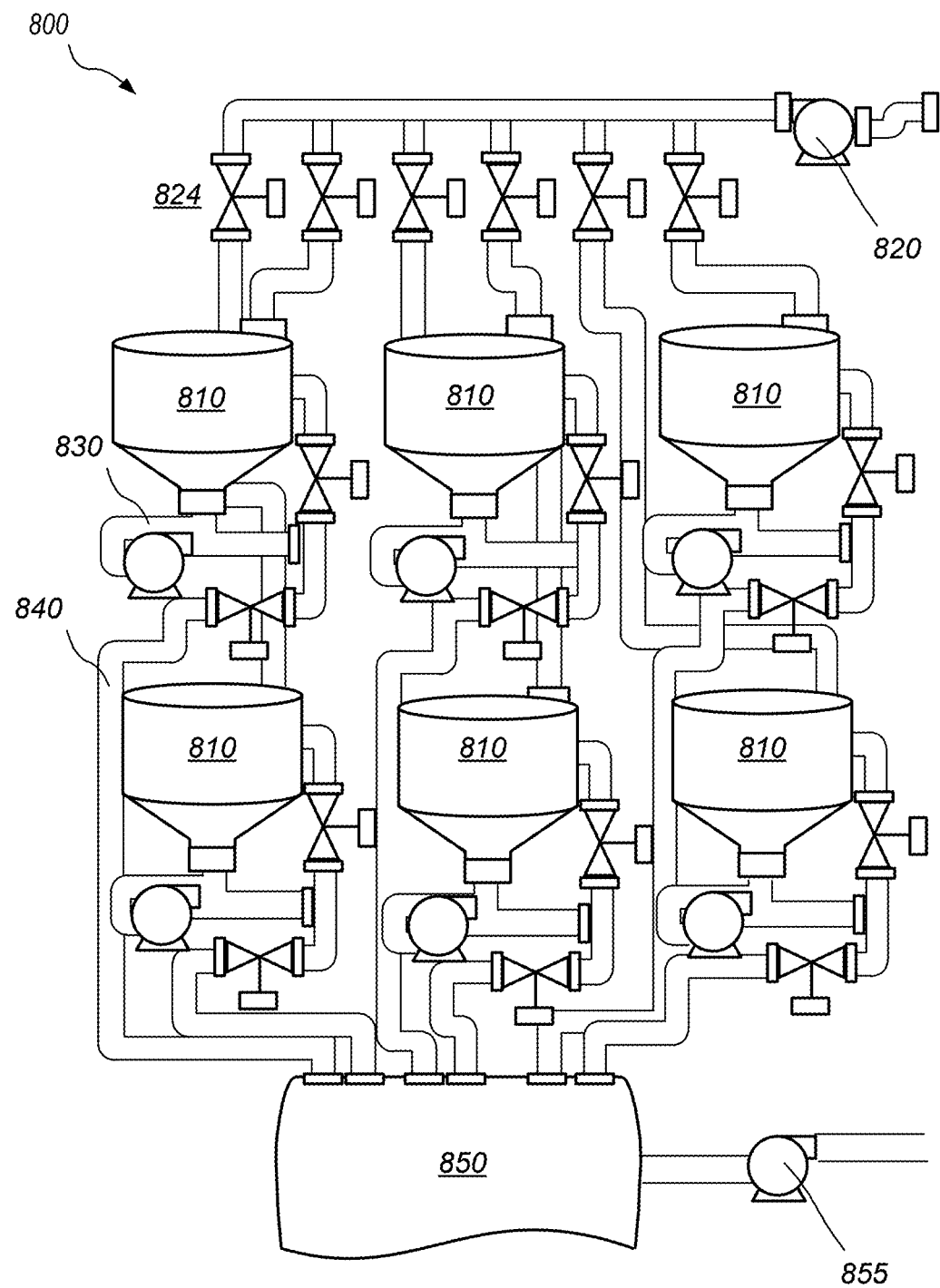
FIG. 8 depicts a schematic diagram of a bacteria generation system.

FIG. 8 depicts an embodiment of a bacteria generation system 800 that includes a plurality of bacteria generators 810 that generate bacteria to be used in a bioreactor. Each bacteria generator 810 may be operated simultaneously or individually to generate bacteria. In some embodiments, each bacteria generator 810 is used to generate a different strains of bacteria.

Alternatively some or all of the bacteria generators may generate the same strain or strains of bacteria. Bacteria generation system 800 includes fluid supply system 820 which includes pump 822 and a plurality of valves 824. Pump 822 is coupled to a fluid source and transfers fluids from the fluid source to one or more of bacteria generators 810. The fluid source may be water or a water based bacterial growth medium. If water is used as the fluid source, the process of generating bacteria includes adding bacterial growth medium to the bacteria generators being used to generate the bacteria. One or more of valves 824 may be opened to appropriately direct fluid from pump 822 to one or more of the bacteria generators.

Each of bacteria generators 810 include a recirculation conduit 830 and a drain conduit 840. Recirculation conduit 830 is used to circulate the fluids out of, and back into, a bacteria generator. This creates the necessary agitation/mixing to ensure proper growth of the bacteria in the bacteria generator. By using a recirculating mixture, mechanical agitation of the bacteria generators is not necessary. Drain conduits 840 allow bacteria formed in bacteria generators 810 to be removed and collected for use in a bioreactor. The generated bacteria are collected in a bacteria collection tank 850. Bacteria collection tank 850 is coupled to bacteria transfer pump 855, which sends bacteria, in some embodiments, to bacteria inlet conduit 740 of the sedimentation system (See FIG. 7).

Bacteria used in bacteria generators 810 may be in a preserved state. In one embodiment, bacteria are generated using bacteria generators by filling one or more of bacteria generators 810 with an appropriate amount of water. Growth medium (for example as a dry ppowder, or as a concentrate) is added to one or more of bacteria generators 810 and the growth medium is mixed with the water by recirculating the mixture until substantially homogenous. Bacteria stored in a preserved state are added to one or more of the bacteria generators and the mixture is mixed for a time sufficient to increase the concentration of bacteria in the bacteria generators used. After the bacteria is generated, the produced bacteria is drained from the bacteria generators into bacteria collection tank 850. From bacteria collection tank 850 the generated bacteria may be transferred to one or more bioreactors through the sedimentation system.

To preserve bacteria. one or more types of bacteria are incubated and allowed to grow and/or reproduce in the presence of one or more nutrients. In an embodiment, bacteria may be incubated and reproduce in one or more bacteria generators. The flow of nutrients is then terminated and the bacteria are allowed to enter a starvation phase. In an embodiment, the starvation phase for the bacteria may be identified by determining when exponential growth of the bacteria has ended. The change in the number of bacteria may be monitored spectroscopically. The bacteria in the starvation phase may then be preserved.

In some embodiments, the bacteria may be inoculated prior to preservation. Bacteria in the starvation phase produce stress proteins that protect the bacteria from shock. Therefore, when bacteria are inoculated, a greater percentage of bacteria in the starvation phase would be able to survive the shock due to the increased production of stress proteins. Stressing bacteria prior to preservation may allow hardier bacteria to survive the stress of inoculation while the weaker bacteria may die during inoculation. Therefore, it may be advantageous to stress bacteria prior to preserving the bacteria, since the shock may only allow hardier bacteria to be preserved.

It may be advantageous, in some embodiments, to preserve bacteria in the starvation phase. The starvation phase occurs during the stationary phase of bacteria. During the starvation or stationary phase, the rate of change of the number of bacteria is approximately constant since the number of bacteria generated is approximately the same number of bacteria that die. Using bacteria in the starvation phase may also be desirable, since when starved bacteria are introduced into an environment with nutrients, the bacteria are hungrier and more competitive for the available carbonaceous material.

In some embodiments, bacteria in the starvation phase may be preserved as bacteria-alginate beads, where the bacteria is immobilized in a bead. To produce bacteria-alginate beads, bacteria is mixed with an alginate, such as sodium alginate. In an embodiment, alginate is added to an aqueous solution including the bacteria in the starvation phase. In another embodiment, bacteria in the starvation phase may be added to an aqueous alginate solution. The sodium alginate or a viscous aqueous solution containing alginate may be autoclaved at a temperature from approximately 115° C. to approximately 125° C. The bacteria-alginate mixture is stirred. The viscosity of the bacteria-alginate mixture may increase while stirring. The bacteria-alginate mixture is then added to an aqueous solution containing calcium ions.

In an embodiment, the bacteria-alginate mixture is added in drops to the aqueous solution containing calcium ions. Bacteria-alginate particles are allowed to form in the calcium ion solution. The bacteria-alginate particles may be firm and not as compressible as a gelatinous substance. The bacteria-alginate particles may be separated from the solution and/or dried. The bacteria-alginate particles may be filtered from the solution in an aseptic environment. The preserved bacteria-alginate particles may be stored until needed and/or used in bacteria generators in a system for the reduction of contaminants in water. In an embodiment, when the bacteria-alginate particles are revived in a solution of nutrients, the bacteria may consume and/or degrade the alginate portions of the particle.

The size and shape of the bacteria-alginate particles may be controllable. The amount of bacteria-alginate mixture added or dropped into the calcium solution may control the size of the particles formed. The bacteria-alginate mixture may be sprayed onto the aqueous solution containing calcium ions to produce small substantially spherical-shaped particles. Particles that are substantially cubic, pyramidal, conical, or irregularly shaped may also be formed.

In other embodiments, bacteria in the starvation phase may be preserved on hydrophobic substrates. To produce immobilized bacteria in the starvation phase on a hydrophobic substrate, bacteria may incubate in a solution containing one or more hydrophobic substrates until the bacteria are in the starvation phase. Alginate is mixed in an aqueous solution and may be autoclaved at a temperature from approximately 115° C. to approximately 125° C. The hydrophobic substrate that includes the bacteria in the starvation phase may then be introduced into the alginate solution. Alginate may at least partially saturate the hydrophobic substrate. The hydrophobic substrate then may be contacted with an aqueous solution containing calcium ions. The hydrophobic substrate may be separated from the solution and/or vacuum filtered. The hydrophobic substrate may be allowed to dry. In certain embodiments, the hydrophobic substrate containing preserved bacteria in the starvation phase may be stored until needed, used in bacteria generator in a system for reduction of contaminants in water, and/or added to a container to form a biofilm.

Although adding bacteria-alginate mixture to calcium ions is described, other metal ions solutions may be used successfully as well, including barium, copper, or zinc metal ion solutions. It may be desirable to use a calcium ion solution because calcium is available at a low cost from sources such as limestone and/or calcium is not generally considered a contaminant, unlike copper or zinc.

Preserving bacteria in particles or immobilizing bacteria on hydrophobic substrates may allow the preserved bacteria to be more resilient to environmental stress and/or toxins and/or may reduce cell mortality upon revival. Unlike when using preservation methods currently known in the art, such during lyophilization or the formation of compressed tablets, the bacteria are not dried to desiccation when bacteria are in particles or immobilized on substrates. Although lyophilized bacteria and compressed pellet bacteria have long shelf lives, it may take a long period for the bacteria to acclimate to surroundings and return to an exponential growth stage. Bacteria in particles and immobilized on substrates may become physiologically active within a shorter period of time since the cells do not have to be hydrated since they were not desiccated to the same extent during preservation.

In some embodiments, the preserved bacteria in particles and/or hydrophobic substrate may be added to bacteria generator to produce bacteria for a container in a system for the reduction of contaminants in wastewater. The preserved bacteria may be revived from the starvation phase and enter exponential growth phase when introduced into an aqueous solution containing nutrients. The preserved bacteria may consume the alginate in the particle and/or hydrophobic substrate. After a period of incubation, the bacteria may then be introduced into a container to form and/or replenish a biofilm. In an alternative embodiment, preserved bacteria in or on hydrophobic substrate may be added directly to a container to form a biofilm.

Wastewater treated in a treatment system that includes one or more bioreactors may be further purified by passing the treated wastewater stream to a purification system 600. Purification system may include one or more filtration systems that receive an effluent stream from one or more of the bioreactors and produces a filtered water stream. Examples of filtration systems that may be used include, but are not limited to a granulated activated carbon filter or a membrane-based filter. An activated carbon filter may remove organic compounds, metal ions, fine particles and/or bacteria from fluid flowing through activated carbon filter. Membrane based filtration include reverse osmosis, micro, and ultrafiltration membranes.

Metal removing system 600 may also include electrocoagulation and electroplating systems. An electrocoagulation system may be used to precipitate metal ions for removal. In an embodiment, an electrocoagulation system may charge ions in a fluid between two charged metal objects (e.g., metal plates or rods) disposed at a fixed distance from each other. When an electrical potential is applied to the metal objects, charged ions may bind to oppositely charged ions and form a precipitate. The formed precipitates may float to a top surface or sink to a bottom surface of the metal removing system for removal from the fluid. In an embodiment the precipitates may be filtered out of the fluid. An electroplating system may also include two charged metal objects disposed at a fixed distance from each other. When an electrical potential is applied to the metal plates, metal ions between the charged metal objects may become plated onto one or both of the metal objects. In some embodiments, a metal removing system may be capable of both precipitation and plating of metal ions. Metal removing systems are described in further detail in U.S. Pat. No. 7,914,662, which is incorporated herein by reference.

Figure 9:
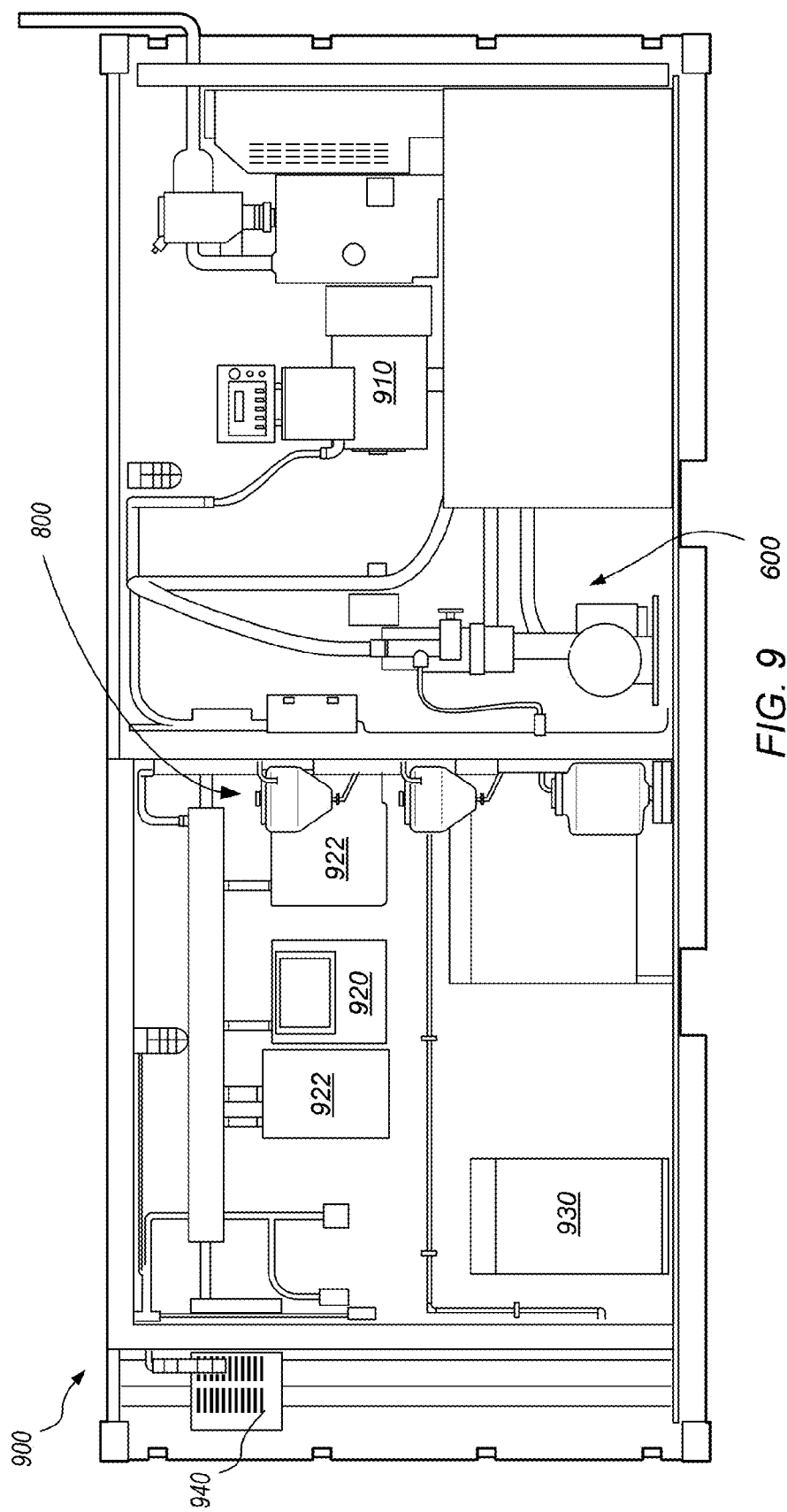
FIG. 9 depicts a cross-sectional view of a control unit.

Purification system 600 and bacteria generation system 800 may be positioned in a structure 900. In some embodiments, structure 900 is a portable structure. For example, structure 900 may be an a high cube, 20' ISO container. FIG. 9 depicts a structure 900 that includes a purification system 600, a bacteria generation system 800, a power generator 910, a controller system 920, electrical panels 922, a cooler 930 for the preservation of bacteria, and a cooling system 940 for controlling the temperature inside the structure. Power generator 910 is used to generate power to operate controllers, valves and sensors during operation. Power generator also supplies power for bacteria generator, and cooling systems. In some embodiments, generator is a diesel or gas powered generator. Controller 920 may be capable of controlling operation of the components of the wastewater treatment system. For example, controller 920 may be a computer that is coupled, through electrical panels 922 to various valves and sensors in a wastewater treatment system. Computer controller 920 is capable of implementing software configured to allow automatic, semi-automatic, and/or manual operation of the wastewater treatment system. Cooler 930 may be a refrigerator that is capable of maintaining bacteria in a dormant state. Cooling system 940 may b a fan or air conditioning unit that allows the temperature inside the structure to be controlled.

In some embodiments, a wastewater treatment system may be divided into separate portable structures. A portable structure may be formed of plastic, metal, and/or other materials. A portable structure may include one or more coatings. A coating may inhibit corrosion and/or facilitate removal of solids from the portable structure. For example, a portable structure may have a polytetrafluoroethylene coating to inhibit corrosion and to inhibit solids from adhering to the container. In some embodiments, a footprint of a portable structure may be substantially square, substantially circular, substantially oval, substantially rectangular, and/or irregularly shaped.

Figure 10:
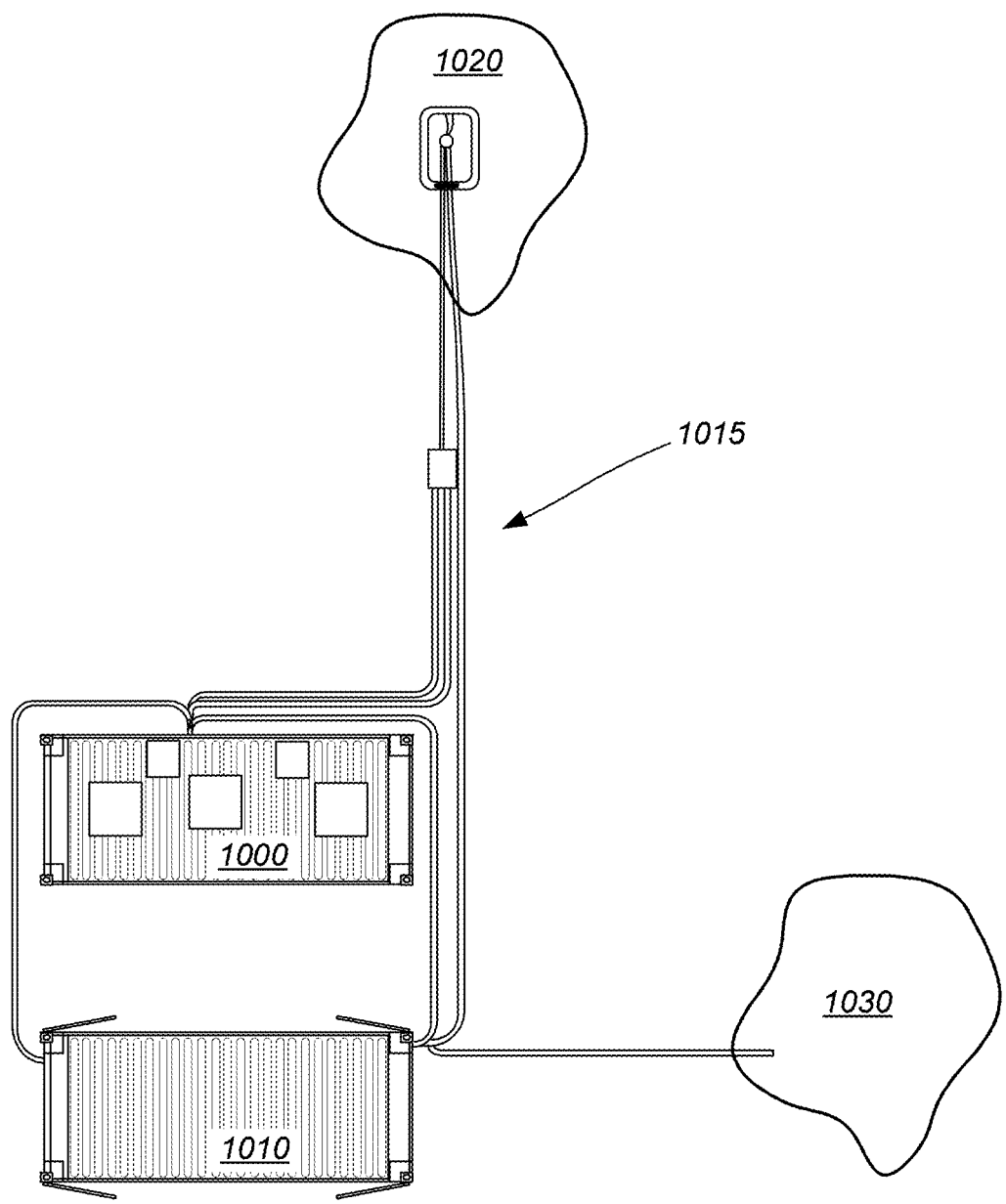
FIG. 10 depicts a schematic diagram of a non-buffered wastewater treatment system.

For example, a non-buffered wastewater treatment system may include a treatment unit 1000 and a control unit 1010, as depicted in FIG. 10. Treatment unit 1000 may include one or more bioreactors and one or more sedimentation systems in a portable structure. An example of a treatment unit is depicted in FIG. 6. Control unit 1010 includes a purification system, a bacteria generation system, a power generator, controllers, and other equipment as described above. Non-buffered wastewater treatment system may be positionable near a source of wastewater 1020 and near a treated water retaining area 1030. Conduits 1015 are used to fluidically and electrically interconnect treatment unit 1000, control unit 1010, wastewater source 1030, and treated water retaining area 1030. Separating control unit from treatment unit helps to ensure that water sensitive components such as controllers and generators, are isolated from the water treatment areas.

Figure 11:
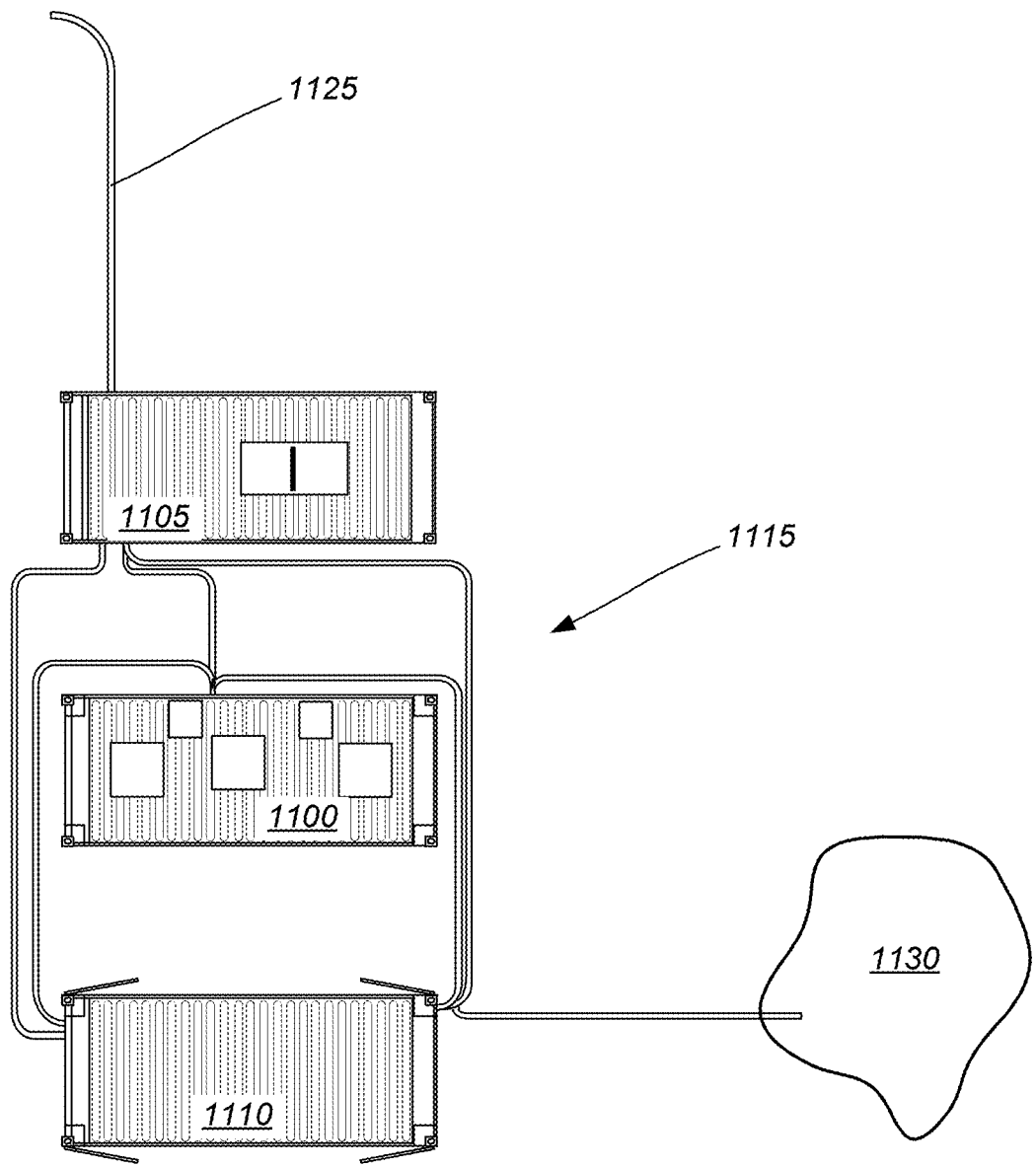
FIG. 11 depicts a schematic diagram of a buffered wastewater treatment system.

A buffered wastewater treatment system may include a buffer unit 1105, a treatment unit 1100 and a control unit 1110, as depicted in FIG. 11. Treatment unit 1000 may include one or more bioreactors and one or more sedimentation systems in a portable structure. An example of a treatment unit is depicted in FIG. 6. Control unit 1110 includes a purification system, a bacteria generation system, a power generator, controllers, and other equipment as described above. Buffered wastewater treatment system may be positionable near a treated water retaining area 1130. Conduits 1115 are used to fluidically and electrically interconnect buffer unit 1105, treatment unit 1100, control unit 1110, and treated water retaining area 1130. System input conduit 1125 is used to introduce wastewater into the system from various sources. For example, trucks carrying wastewater may be couplable to system input conduit 1125 to allow the introduction of wastewater from various sources. Separating control unit from treatment unit helps to ensure that water sensitive components such as controllers and generators, are isolated from the water treatment areas.

In one embodiment, a method of treating a wastewater stream that includes one or more inorganic salts includes introducing the wastewater stream into a bioreactor. The bioreactor includes one or more substrates and one or more bacteria coupled to one or more of the substrate. The bacteria are conditioned bacteria that are capable of reducing contaminants in a wastewater stream comprising one or more inorganic salts at a concentration of at least 0.5% by weight. The method includes contacting the wastewater stream with the bacteria in the bioreactor. The method further includes removing at least a portion of the contacted wastewater stream from the bioreactor. The concentration of contaminants in the removed portion of the contacted wastewater stream is less than the initial concentration of contaminants in the wastewater stream. For example, a wastewater stream having an inorganic concentration of greater than about 0.5% by weight may be treated in a bioreactor by contacting the wastewater stream with the bacteria for a sufficient amount of time to remove organic contaminates and/or inorganic salts from the wastewater stream.

Water obtained from various natural sources have different salt concentrations. For example, fresh water is considered to have a salt content of less than about 0.5% total dissolved salts. Brackish water has a salt content of between about 0.5% and about 3.0% total dissolved salts. Saline water has a salt content of between about 3.0% and about 5.0% total dissolved salts. Brine water has a salt content of greater than about 5.0% total dissolved salts.

In one embodiment, salt conditioned bacteria are used to reduce the concentration of inorganic salts in water obtained from a natural body of water having an inorganic salt concentration of at least 0.5% by weight. In one embodiment, salt conditioned bacteria are used to reduce the concentration of inorganic salts in water obtained from a natural body of water having an inorganic salt concentration of at least 1% by weight. In one embodiment, salt conditioned bacteria are used to reduce the concentration of inorganic salts in water obtained from a natural body of water having an inorganic salt concentration of at least 3% by weight. In one embodiment, salt conditioned bacteria are used to reduce the concentration of inorganic salts in water obtained from a natural body of water having an inorganic salt concentration of greater than 5% by weight. In some embodiments, waster is contacted for a time sufficient to lower the concentration of one or more inorganic salts in the water to be less than 0.5%. In some embodiments, the water to be treated includes organic contaminants, and the bacteria remove at least a portion of the organic contaminants.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Producing Bacteria in the Starvation Phase

Bacteria was incubated in a nutrient broth at a temperature of from approximately 25° C. to approximately 30° C. depending on which bacteria is being preserved. Bacteria in the genus *Agrobacterium, Bacillus, Caulobacter, Enterobacter, Gordonia, Zoogloea* and *Peudomonas* were incubated at 30° C. Bacteria in the genus *Agrobacterium* and *Zoogloea* were incubated at 26° C. The bacteria were allowed to incubate for 24 to 72 hours without the addition of an additional amount of nutrients. Bacteria in the genus *Agrobacterium, Bacillus, Enterobacter,* and *Peudomonas* were incubated for 24 to 48 hours. Bacteria in the genus *Caulobacter* and *Gordonia* were incubated for 48 to 72 hours. Bacteria were spectroscopically monitored to determine when exponential growth ceases and bacteria have entered the starvation phase.

In one embodiment, a specific bacteria mixture for use in treating wastewater includes *Enterobacter cloacae, Pseudomonas putida, Pseudomonas stutzeri, Gordonia* sp., *Bacillus subtilis, Agrobacterium* sp., *Caulobacter vibrioides, Caulobacter crescentus* and bacteria in the genus *Zoogloea.*

Example 2

Producing Bacteria-Alginate Particles 40 g of sodium alginate was mixed into an aqueous solution to form solution more viscous than water. The alginate solution was autoclaved at 121° C. for 30 minutes. The alginate solution was then allowed to cool. 500 ml of bacteria in the starvation phase, prepared according to Example 1, was added to the alginate solution to form bacteria-alginate mixture. The bacteria-alginate solution was agitated. The bacteria-alginate solution was added in drops into 2 L of 0.55 M calcium chloride solution. The calcium chloride solution was mixed continuously. Particles, with a length and a width of approximately 5 mm, formed in the calcium chloride solution. The particles were then filtered under at least a partial vacuum using Whatman 40 filter paper, commercially available from Whatman (Middlesex, United Kingdom). The particles were then dried and stored.

Example 3

Treating Hydraulic Fracturing Backflow Water With Salt Conditioned Bacteria

In an experiment, backflow water, obtained from a hydraulic fracturing site was treated in a wastewater treatment system having bacteria that were conditioned to tolerate water with dissolved salts greater than 8.5% in laboratory cultures. The bacteria were used in a wastewater system as described in FIGS. 1-11. After passing the hydraulic fracturing wastewater through a bioreactor, the resulting treated stream was passed into a purification system having a metal removing system. In this experiment, the metal removing system was an electrocoagulation system.

Figure 12:
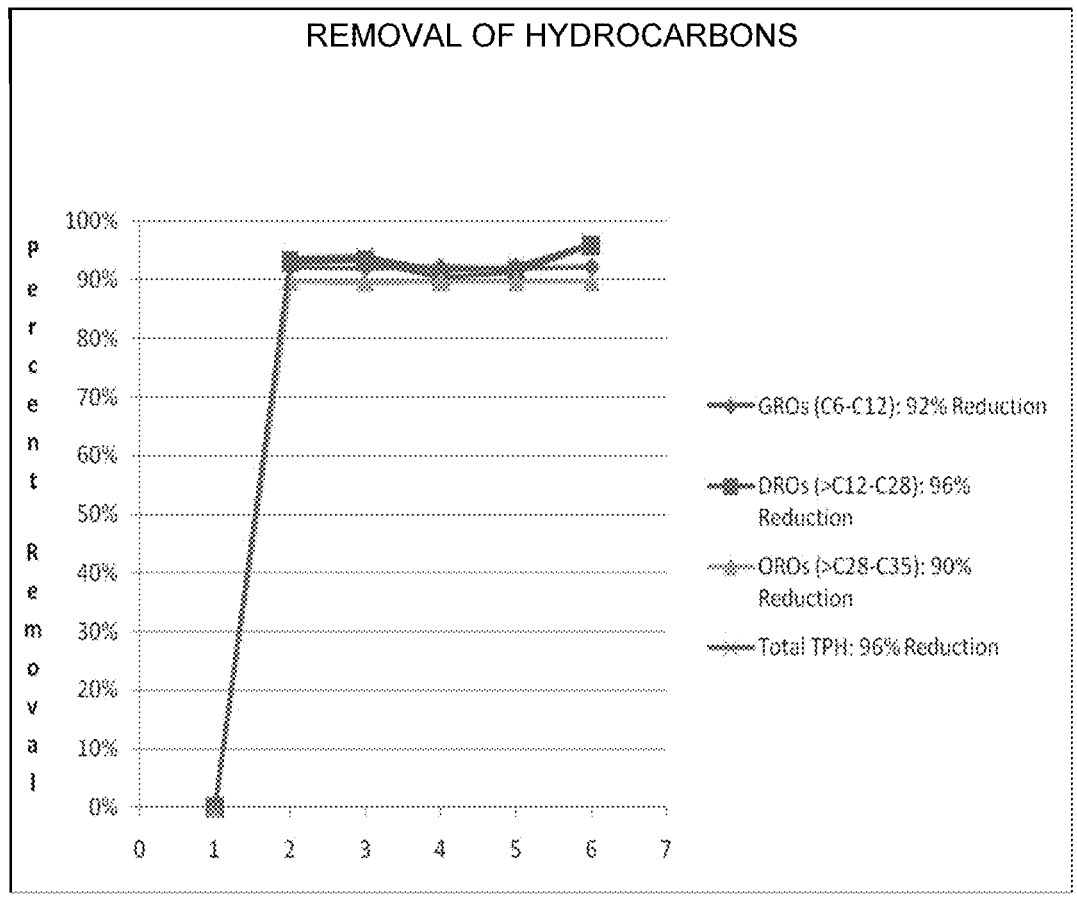
FIG. 12 depicts the effect of the bacteria on the removal of hydrocarbons from the wastewater stream.

FIG. 12 depicts the effect of the bacteria on the removal of hydrocarbons from the wastewater stream. The results show that the removal of hydrocarbons is at least 90% for the various hydrocarbons tested, including gasoline range organics ($C_6$-$C_{12}$), diesel range organics (C12-C28), and oil range organics (C28-C35). TPH stands for total petroleum hydrocarbons.

Figure 13:
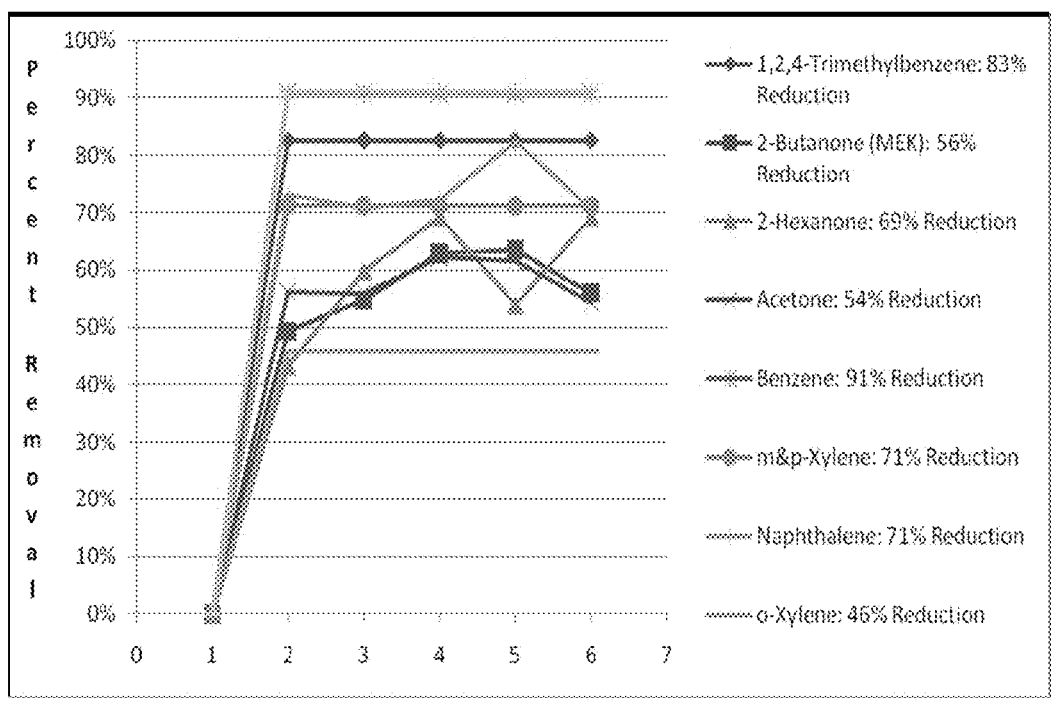
FIG. 13 depicts the effect of the bacteria on the removal of volatile hydrocarbons from the wastewater stream.

FIG. 13 depicts the effect of the bacteria on the removal of volatile hydrocarbons from the wastewater stream. The results show good removal of many different types of volatile organic compounds.

Figure 14:
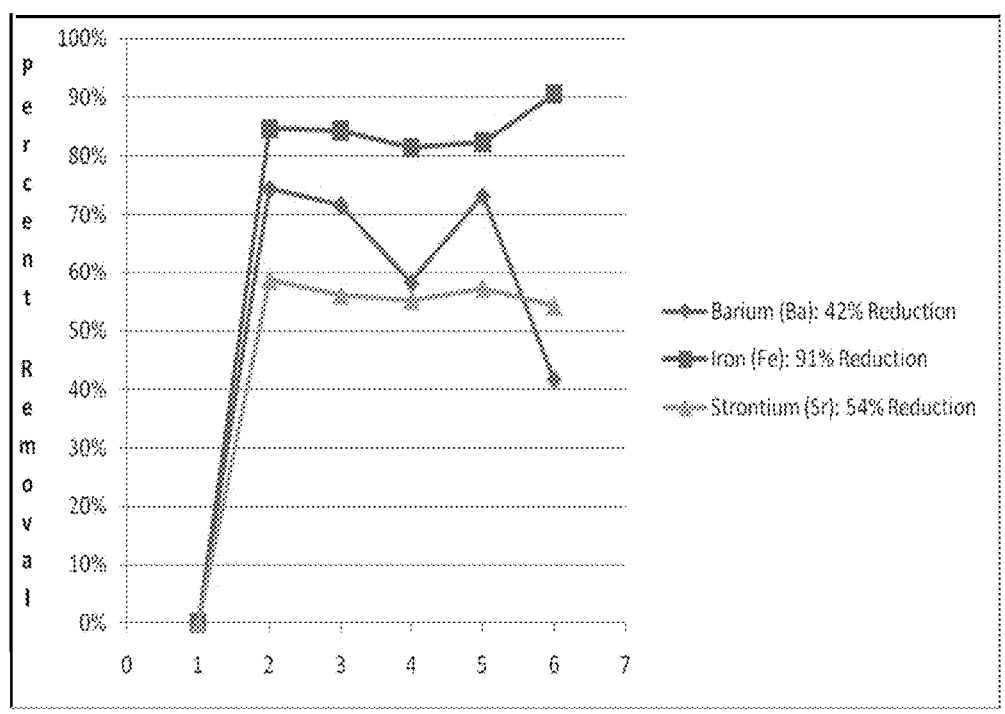
FIG. 14 depicts the effect of the bacteria on the removal of barium, iron, and strontium from the wastewater stream.

FIG. 14 depicts the effect of the bacteria on the removal of barium, iron, and strontium from the wastewater stream. The results show good removal of barium and strontium and nearly complete removal of iron.

After passing the wastewater stream through a bioreactor that includes salt conditioned bacteria, the wastewater stream was passed through an electrocoagulation system. FIGS. 15-20 depict the effect of electrocoagulation treatment and combined biological and electrocoagulation treatment on the concentration of metals in the wastewater stream.

Figure 15:
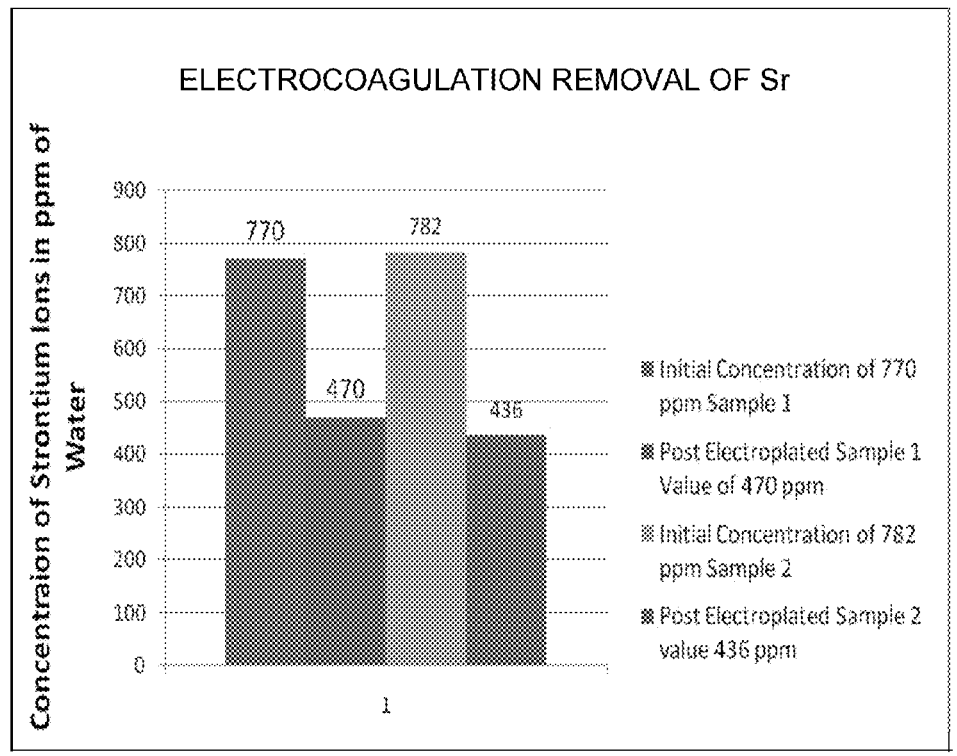
FIG. 15 depicts the electrocoagulation removal of strontium from biologically treated hydraulic fracturing wastewater.
Figure 16:
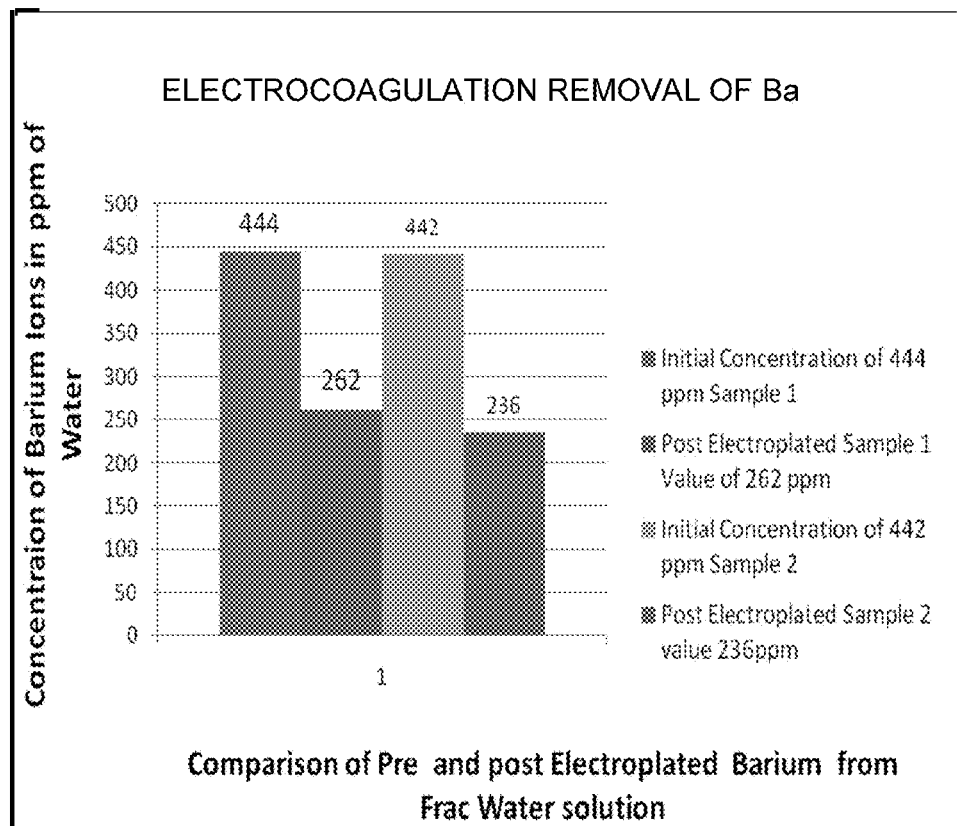
FIG. 16 depicts the electrocoagulation removal of barium from biologically treated hydraulic fracturing wastewater.
Figure 17:
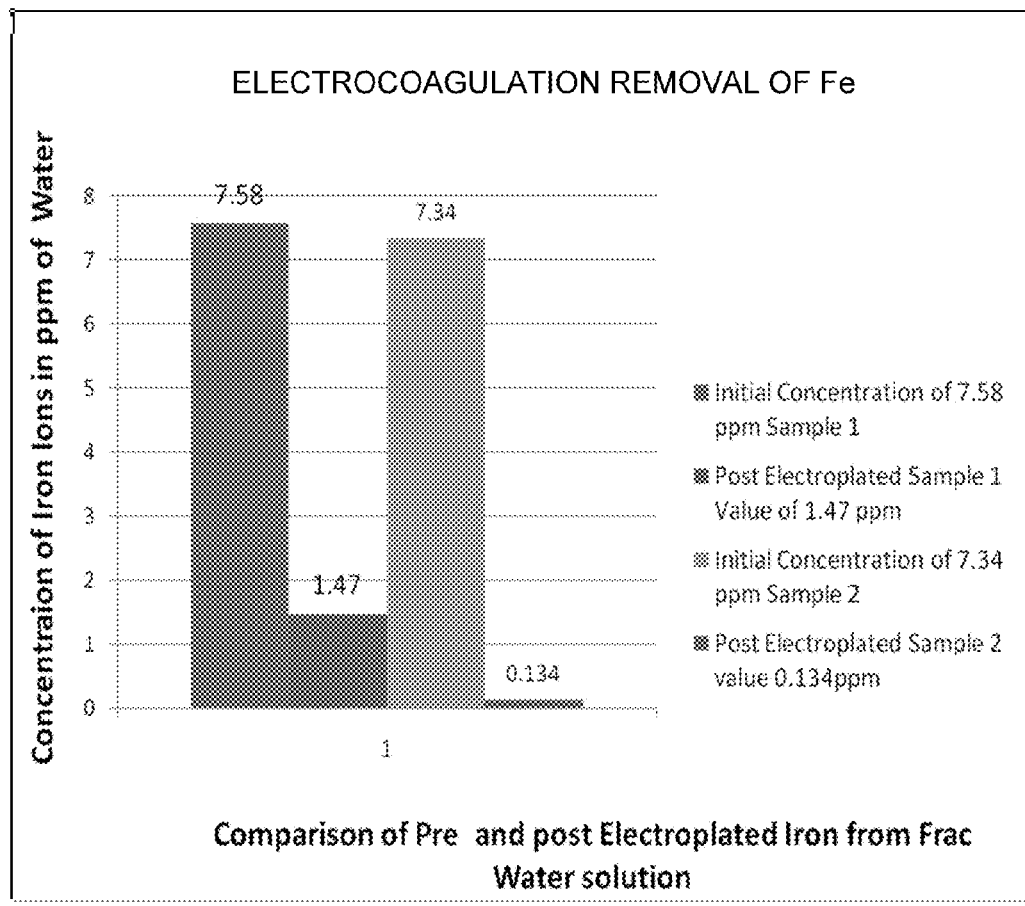
FIG. 17 depicts the electrocoagulation removal of iron from biologically treated hydraulic fracturing wastewater.
Figure 18:
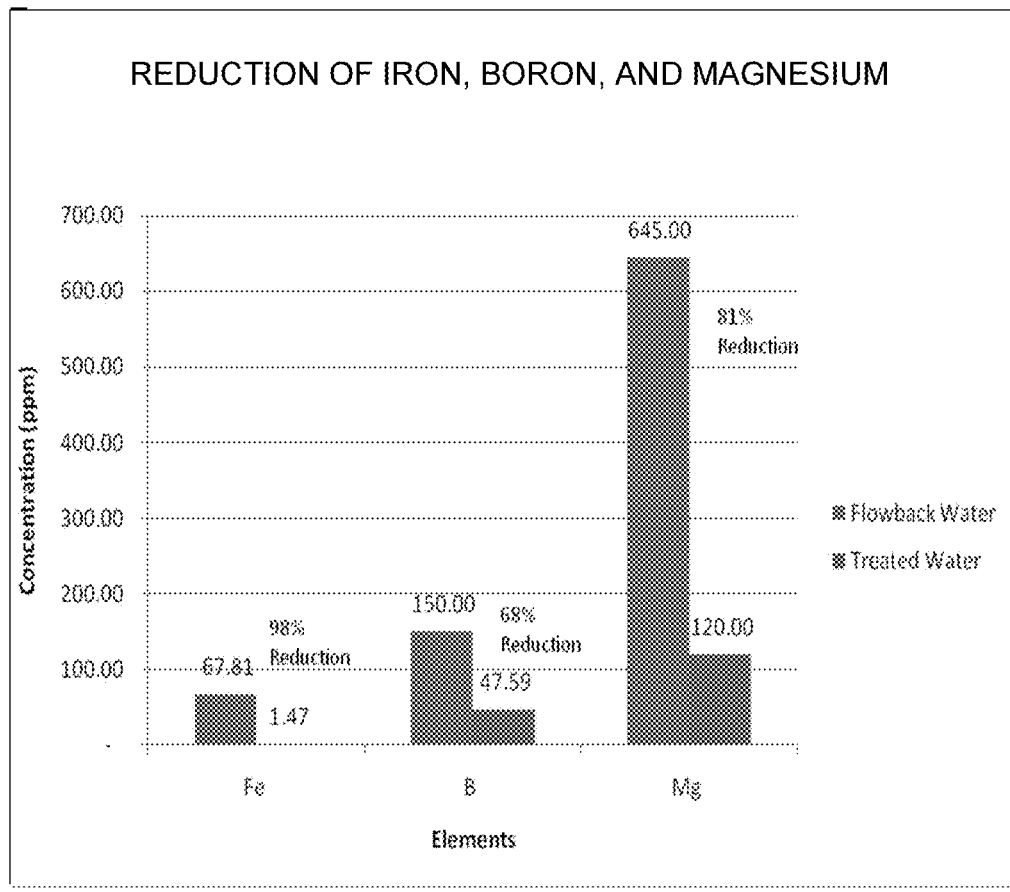
FIG. 18 shows a summary of the results for the removal of iron, boron and magnesium from biologically treated hydraulic fracturing wastewater after electrocoagulation.
Figure 19:
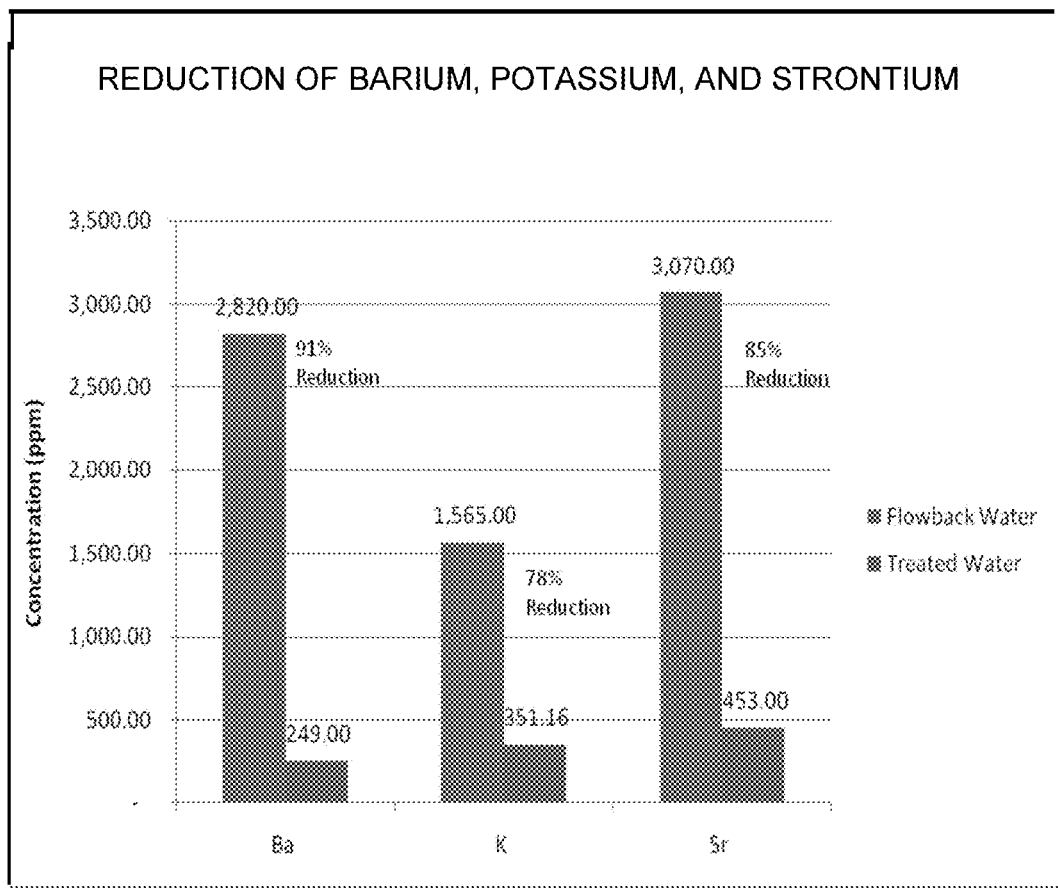
FIG. 19 shows a summary of the results for the removal of barium, potassium and strontium from biologically treated hydraulic fracturing wastewater after electrocoagulation.
Figure 20:
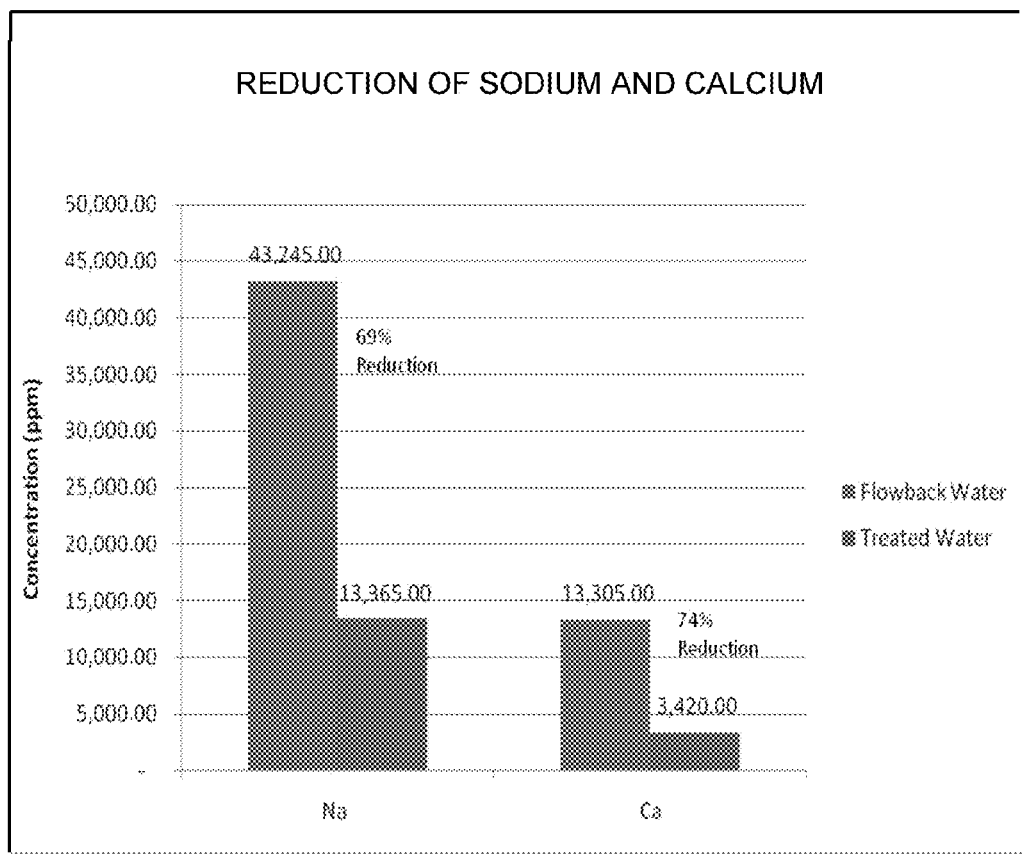
FIG. 20 shows a summary of the results for the removal of sodium and calcium from biologically treated hydraulic fracturing wastewater after electrocoagulation.

FIG. 15 depicts the electrocoagulation removal of strontium from biologically treated hydraulic fracturing wastewater. Electrocoagulation was performed using two 10 cm×10 cm aluminum plates spaced apart at a distance of 10 cm. FIGS. 16 and 17 depict the removal of barium and iron, under the same conditions. FIG. 18 shows a summary of the results for the removal of iron, boron and magnesium from biologically treated hydraulic fracturing wastewater after electrocoagulation. FIG. 19 shows a summary of the results for the removal of barium, potassium and strontium from biologically treated hydraulic fracturing wastewater after electrocoagulation. FIG. 20 shows a summary of the results for the removal of sodium and calcium from biologically treated hydraulic fracturing wastewater after electrocoagulation.

Figure 21:
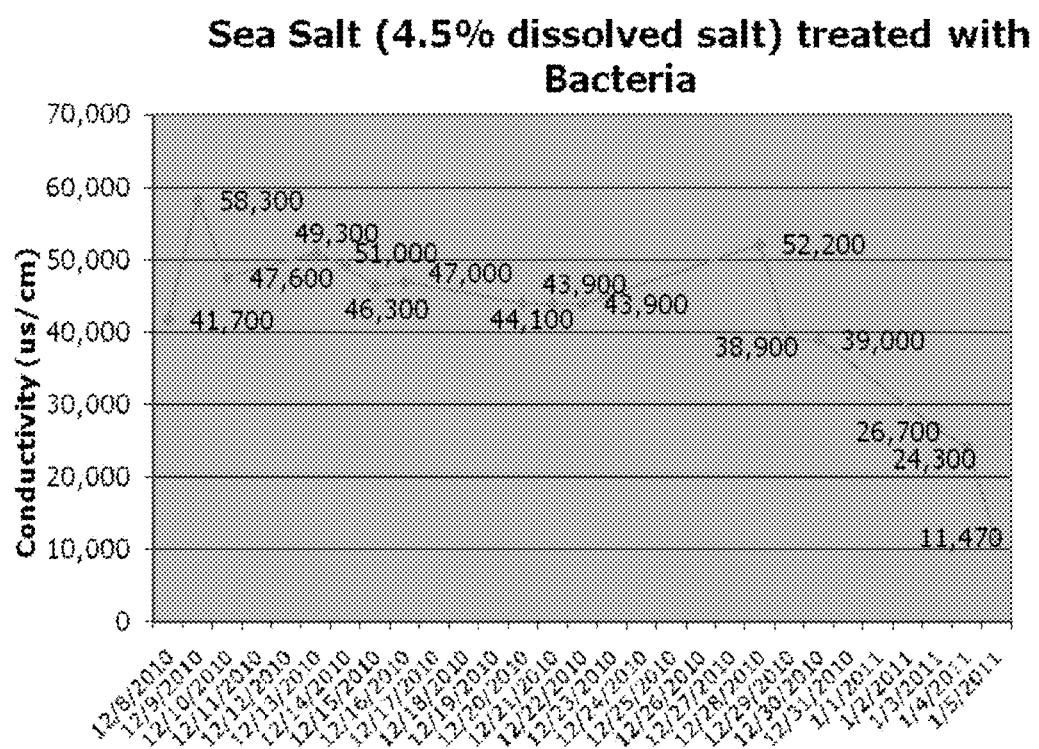
FIG. 21 depicts the conductivity of sea water after treatment with salt conditioned bacteria over about a one month time period.

FIG. 21 depicts the conductivity of sea saltwater after treatment with salt conditioned bacteria over about a one month time period.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of treating a wastewater stream comprising one or more inorganic salts, the method comprising:
introducing the wastewater stream into a bioreactor, wherein the bioreactor comprises one or more substrates and one or more bacteria coupled to one or more of the substrates, wherein one or more of the bacteria are capable of reducing contaminants in a wastewater stream comprising one or more inorganic salts at a concentration of at least 0.5% by weight;
contacting the wastewater stream with the bacteria in the bioreactor;
removing at least a portion of the contacted wastewater stream from the bioreactor, wherein the concentration of contaminants in the removed portion of the contacted wastewater stream is less than the initial concentration of contaminants in the wastewater stream,
wherein one or more of the bioreactors further comprise an oxygen inlet conduit and a diffuser coupled to the oxygen inlet conduit, wherein the method further comprises passing oxygen through the oxygen inlet conduit into the diffuser and through the diffuser into the bioreactor.

2. The method of claim 1, wherein the bacteria remove at least a portion of the inorganic salts from the wastewater stream.

3. The method of claim 1, wherein the wastewater stream comprises organic contaminants and wherein the bacteria remove at least a portion of the organic contaminants.

4. The method of claim 1, wherein the wastewater stream comprises organic contaminants and wherein the bacteria remove at least a portion of the organic contaminants and at least a portion of the one or more inorganic salts.

5. The method of claim 1, wherein one or more inorganic salts are transition metal salts.

6. The method of claim 1, wherein one or more inorganic salts are alkali metal salts and/or alkaline earth metal salts.

7. The method of claim 1, wherein one or more of the bioreactors are housed in a portable structure.

8. The method of claim 1, wherein the substrate comprises a polymer substrate.

9. The method of claim 1, wherein the substrate comprises a ceramic substrate.

10. The method of claim 1, wherein one or more of the bacteria comprise primary adherer bacteria that couple to the substrate and secondary bacteria which couple to the primary adherer bacteria to form a biofilm.

11. The method of claim 10, wherein the secondary bacteria are substantially unable to couple to the substrate.

12. The method of claim 1, wherein one or more of the bacteria comprise bacteria of the genus *Caulobacter*.

13. The method of claim 1, wherein one or more of the bioreactors comprise a mixture of bacteria, the mixture comprising bacteria of the genus *Caulobacter*; bacteria of the genus *Enterobacter*; bacteria of the genus *Pseudomonas*; bacteria of the genus *Gordonia*; bacteria of the genus *Bacillus*; bacteria of the genus *Agrobacterium*; and bacteria of the genus *Zoogloea*.

14. The method of claim 1, further comprising supplying bacteria to one or more of the bioreactors from one or more bacteria generators, wherein the one or more bacteria generators are coupled to the bioreactor inlet of one or more of the bioreactors.

15. The method of claim 1, further comprising supplying bacteria to one or more of the bioreactors from a plurality of bacteria generators coupled to one or more of the bioreactors, wherein each of the bioreactors is independently operated.

16. The method of claim 1, wherein the method further comprises filtering an effluent stream from one or more of the bioreactors to produce a filtered water stream from the effluent stream.

17. The method of claim 1, further comprising passing the wastewater stream through a grinding system coupled to the inlet of the sedimentation system, wherein the grinding system reduces the size of solid matter in a water stream passing through the grinding system.

18. The method of claim 1, further comprising:
   determining a fluid level within one or more of the bioreactors;
   altering the incoming flow rate of the at least partially clarified wastewater stream into the one or more bioreactors based, in part, on the fluid level detected by one or more of the fluid level sensors.

19. A method of removing one or more inorganic salts from water:
   introducing, into a bioreactor, water comprising at least 0.5% by weight of one or more inorganic salts, wherein the bioreactor comprises one or more substrates and one or more bacteria coupled to the substrate, wherein one or more of the bacteria are capable of reducing concentration of inorganic salts in from water comprising at least 0.5% by weight of one or more inorganic salts;
   contacting the water with the bacteria in one or more of the bioreactors;
   removing at least a portion of the contacted water from the bioreactor, wherein the concentration of one or more inorganic salts in the removed portion of the contacted water is less than the initial concentration of one or more inorganic salts in the water;
   wherein one or more of the bacteria comprise primary adherer bacteria that couple to the substrate and secondary bacteria which couple to the primary adherer bacteria to form a biofilm.

20. The method of claim 19, wherein the bacteria remove at least a portion of the inorganic salts from the wastewater stream.

21. The method of claim 19, wherein the wastewater stream comprises organic contaminants and wherein the bacteria remove at least a portion of the organic contaminants.

22. The method of claim 19, wherein the wastewater stream comprises organic contaminants and wherein the bacteria remove at least a portion of the organic contaminants and at least a portion of the one or more inorganic salts.

23. The method of claim 19, wherein one or more of the bioreactors are housed in a portable structure.

24. The method of claim 19, wherein the secondary bacteria are substantially unable to couple to the substrate.

25. The method of claim 19, wherein one or more of the bacteria comprise bacteria of the genus *Caulobacter*.

26. The method of claim 19, wherein one or more of the bioreactors comprise a mixture of bacteria, the mixture comprising bacteria of the genus *Caulobacter*; bacteria of the genus *Enterobacter*; bacteria of the genus *Pseudomonas*; bacteria of the genus *Gordonia*; bacteria of the genus *Bacillus*; bacteria of the genus *Agrobacterium*; and bacteria of the genus *Zoogloea*.

27. The method of claim 19, further comprising supplying bacteria to one or more of the bioreactors from one or more bacteria generators, wherein the one or more bacteria generators are coupled to the bioreactor inlet of one or more of the bioreactors.

28. The method of claim 19, wherein the method further comprises filtering an effluent stream from one or more of the bioreactors to produce a filtered water stream from the effluent stream.

29. The method of claim 19, further comprising passing the wastewater stream through a grinding system coupled to the inlet of the sedimentation system, wherein the grinding system reduces the size of solid matter in a water stream passing through the grinding system.

30. The method of claim 19, further comprising:
   determining a fluid level within one or more of the bioreactors;
   altering the incoming flow rate of the at least partially clarified wastewater stream into the one or more bioreactors based, in part, on the fluid level detected by one or more of the fluid level sensors.

* * * * *

UNITED STATES PATENT AND TRADEMARK OFFICE
CERTIFICATE OF CORRECTION

PATENT NO. : 8,715,503 B2  
APPLICATION NO. : 13/671884  
DATED : May 6, 2014  
INVENTOR(S) : Jones et al.

Page 1 of 1

It is certified that error appears in the above-identified patent and that said Letters Patent is hereby corrected as shown below:

In the Claims:

Claim 1, col. 26, line 62, please delete "stream," and substitute therefor --stream;--.

Signed and Sealed this  
Sixteenth Day of September, 2014

Michelle K. Lee  
*Deputy Director of the United States Patent and Trademark Office*